United States Patent [19]
Masaki

[11] Patent Number: 5,276,792
[45] Date of Patent: Jan. 4, 1994

[54] WORD PROCESSOR PERMITTING MODIFICATION OF A PRESET FRAME

[75] Inventor: Katsumi Masaki, Sagamihara, Japan

[73] Assignee: Canon Kabushiki Kaisha, Tokyo, Japan

[21] Appl. No.: 988,032

[22] Filed: Dec. 9, 1992

Related U.S. Application Data

[63] Continuation of Ser. No. 680,648, Apr. 2, 1991, abandoned, which is a continuation of Ser. No. 358,465, May 30, 1989, abandoned, which is a continuation of Ser. No. 3,854, Jan. 16, 1987, abandoned, which is a continuation of Ser. No. 709,825, Mar. 7, 1985, abandoned, which is a continuation of Ser. No. 306,359, Sep. 28, 1981, abandoned.

[30] Foreign Application Priority Data

| Sep. 29, 1980 | [JP] | Japan | 55-135543 |
| Sep. 29, 1980 | [JP] | Japan | 55-135544 |
| Sep. 29, 1980 | [JP] | Japan | 55-135545 |
| Sep. 29, 1980 | [JP] | Japan | 55-135546 |
| Sep. 29, 1980 | [JP] | Japan | 55-135547 |

[51] Int. Cl.$^5$ .............................. G06F 15/62
[52] U.S. Cl. ................... 395/146; 395/147; 395/148
[58] Field of Search ............... 395/144–149, 155, 161, 100, 156, 157

[56] References Cited

U.S. PATENT DOCUMENTS

| 3,618,032 | 12/1968 | Goldsberry et al. | 400/76 X |
| 4,086,660 | 4/1978 | McBride | 364/900 |
| 4,087,852 | 5/1978 | Campbell et al. | 364/200 |
| 4,189,727 | 2/1980 | Vaughn, Jr. | 364/900 |
| 4,220,417 | 9/1980 | Sprott et al. | 364/900 |
| 4,240,758 | 12/1980 | Acosta | 364/900 |
| 4,345,245 | 8/1982 | Vella et al. | 364/900 |

*Primary Examiner*—Heather R. Herndon
*Attorney, Agent, or Firm*—Fitzpatrick, Cella, Harper & Scinto

[57] ABSTRACT

A word processor comprises a setting unit for setting a frame for entered characters and a unit for processing the characters in the frame. In an edit operation, the characters in the frame are displayed on a CRT screen and edited without affecting information outside of the frame. The word processor further comprises a unit for expanding or reducing the frame.

17 Claims, 20 Drawing Sheets

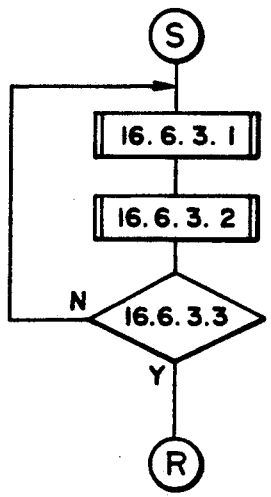
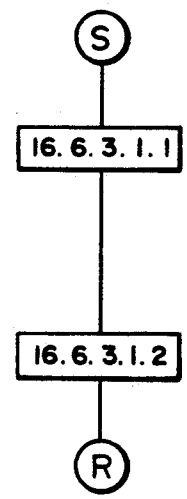
FIG. 18A  FIG. 19A
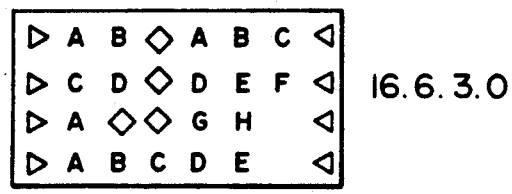 16.6.3.0
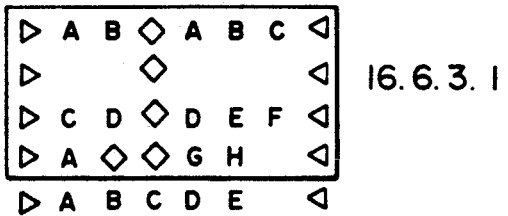 16.6.3.1
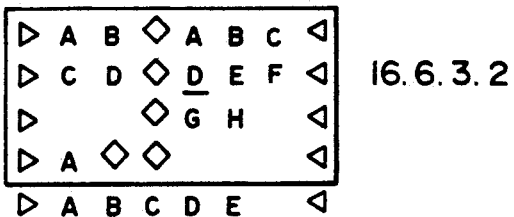 16.6.3.2
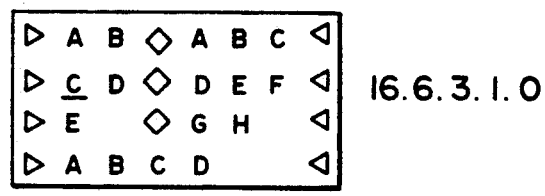 16.6.3.1.0
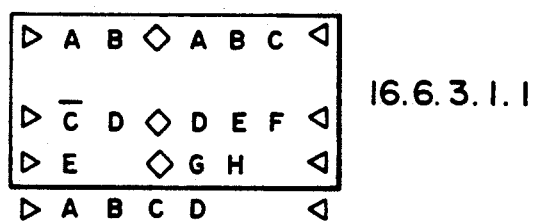 16.6.3.1.1
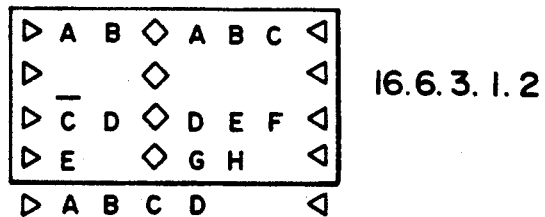 16.6.3.1.2
FIG. 18B  FIG. 19B

WORD PROCESSOR PERMITTING MODIFICATION OF A PRESET FRAME

This application is a continuation of application Ser. No. 07/680,648 filed Apr. 2, 1991, now abandoned, which is a continuation of application Ser. No. 07/358,465 filed May 30, 1989, now abandoned, which is a continuation of application Ser. No. 07/003,854 filed Jan. 16, 1987, now abandoned, which is a continuation of application Ser. No. 06/709,825 filed Mar. 7, 1985, now abandoned, which is a continuation of application Ser. No. 06/306,359 filed Sep. 28, 1981, now abandoned.

BACKGROUND OF THE INVENTION

1. Field of the Invention

The present invention relates to a word processor for processing a text.

2. Description of the Prior Art

In a prior art apparatus capable of serially entering characters in a frame such as an area of 15 lines with each line including 20 characters, when it is desire to input a character outside of the frame, it is necessary to position a cursor outside of the frame or to release the frame.

In addition, when a character is overwritten or inserted in the frame area, it may be written outside of the frame. A word processor devised on behalf of the assignee of the present invention has a function of automatically expanding the frame during word processing for the framed area (See Japanese Patent Application No. 54-127203). However, in the proposed word processor, the frame is defined line by line and the effect of the expansion of the frame to other frames is limited to the immediately following line. Therefore, the process is simple.

It has been known to define a frame having a predetermined size and to input characters in the frame. An example thereof is a column of a newspaper. A word processor proposed by the assignee of the present invention enables word processing for the framed area to include modification of the fixed frame. (See Japanese Patent Application No. 54-127203). The proposed word processor, however, is characterized by a restriction that a longitudinal dimension of one frame must be equal to that of the laterally adjacent frame, because flags or registers, one for each line, are used to recognize and discriminate the frame and hence the frames must be delimited for each line.

When an edit process such as deletion is done for an entered character string, it may be necessary to delete one line. For example, when a carriage return (CR) code in the character string is deleted, it is necessary to feed forward the succeeding lines by one line. When a selected full line is deleted, the same process is required. In a word processor capable of setting a plurality of frames on an image screen or a sheet in a desired form and processing character strings within the frames, relative relations among the frames may not be satisfied by the process of deleting more lines or of feeding lines forward line feed process. For example, when a line in a frame is to be deleted or fed forward, the process is different depending on whether or not a character is present is the other frame.

In preparing a formatted document, a plurality of frames are set in an image screen or a sheet and characters are entered in the frames and edited. In a prior art frame processing, a single frame is set in a line or a fixed frame is set like a newspaper but it is not possible to change the sizes of a plurality of frames or define a new frame at a central area.

In a known apparatus, rules are partially patterned so that they can be handled equally with the characters in order for document data including rules to be prepared and provided to a printer. However, in order to prepare the data for series of rule patterns, a plurality of input means corresponding to the number of partial patterns are required, or it is necessary to specify a start point and end point of the rule and convert them to the series of partial pattern data. Furthermore, in the known apparatus, the relation between the rule and the document is not always constant and the relation between the document and the rule is destroyed when correction such as insertion or deletion is made to the document.

SUMMARY OF THE INVENTION

It is an object of the present invention to provide an improved word processor.

It is another object of the present invention to provide a word processor which permits the modification of a preset frame in response to sequential and repetitive keying of a selected key comprising input means.

It is another object of the present invention to provide a word processor which permits the modification of a preset frame in response to sequential and repetitive keying of a carriage return key comprising a keyboard input means.

It is another object of the present invention to provide a word processor which permits setting of any desired frame.

It is another object of the present invention to provide a word processor capable of automatically enlarging a frame.

It is another object of the present invention to provide a word processor having means for recognizing a minimum rectangle defining a frame code for forming a frame so that editing operation is carried out within the frame.

It is another object of the present invention to provide a word processor which permits setting of a frame of any desired vertical and/or horizontal dimensions by keying a cursor key and an indent key as well as which permits cancelling of the frame.

It is another object of the present invention to provide a word processor which permits deletion of a portion of one of a plurality of parallel frames when no character information is included in a corresponding area of a frame adjacent the one frame.

It is another object of the present invention to provide a word processor having a deletion function which is activated to delete a lowermost line in one of a plurality of parallel frames only when no character information is included in areas corresponding to that line in frames on the left and right of the one frame.

It is another object of the present invention to provide a word processor having an indent right shift key, an indent left shift key and an indent key so that a lateral dimension (or longitudinal dimension for a longitudinal format) of a frame can be varied as required and a new frame can be additionally set for a framed area.

It is another object of the present invention to provide a word processor having means for entering a specific pattern (specific code) so that a repetitive pattern of the pattern defined by the entering means is automatically converted to a partial pattern of a rule depending on a surrounding condition.

It is another object of the present invention to provide a word processor capable of converting a combined pattern of a specific pattern to different partial rule patterns by indicating a surrounding condition to be considered by a cursor.

It is another object of the present invention to provide a word processor which permits entering and edit operations within a frame without disturbing the arrangement of rules.

It is another object of the present invention to provide a word processor which carries out editing operation on an input document for each area framed by frame marks and which automatically enlarges or reduces the frame when the enlargement or the reduction of the frame is necessary during the edit operation.

It is another object of the present invention to provide a word processor which converts a frame code to a rule code by using a key for converting the frame code to the rule code once the entering and edit operations of characters have been done for a framed area.

It is another object of the present invention to provide a word processor which converts a frame code to a rule code and, when entering or edit operations on characters are required, converts the rule code to the frame code by a conversion key before the entering or edit operations are carried out.

Other objects of the present invention will be apparent from the description of the preferred embodiments of the present invention taken in conjunction with the accompanying drawings.

DETAILED DESCRIPTION OF THE PREFERRED EMBODIMENTS

Before discussing the preferred embodiments of the present invention, terms used herein are explained first.

1. Indent Code (Ind)

It is displayed on a CRT by the mark "◊". In inputting characters from a keyboard, a frame is formed by the indent codes.

2. Left Margin Code (LMM)

It is displayed on the CRT by the mark "▷". It indicates a leftmost possible end at which a character can be inputted from the keyboard.

3. Right Margin Code (RMM)

It is displayed on the CRT by the mark "◁". It indicates a rightmost possible end at which a character can be inputted from the keyboard.

4. Indent Block (Inb)

An area framed by indent marks, left margin marks and right margin marks. More exactly, it is defined as follows: Horizontal direction: a minimum area enclosed by the indent marks, left margin marks and right margin marks. Vertical direction: an area having the same setting position of the margin and the indent marks. For an indent block defined only by the left and right margins, it is an area in which a character printed line is continuous. (A cursor position is regarded as a character printed position.)

Figure 2A:
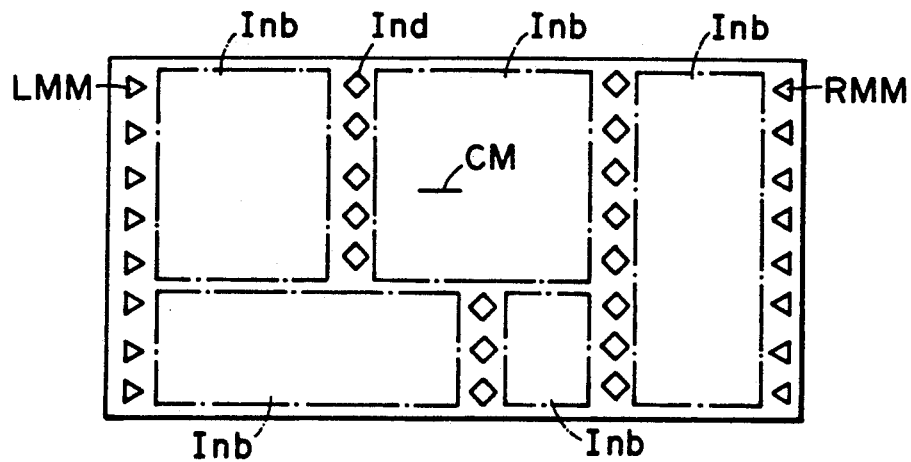
Figure 2B:
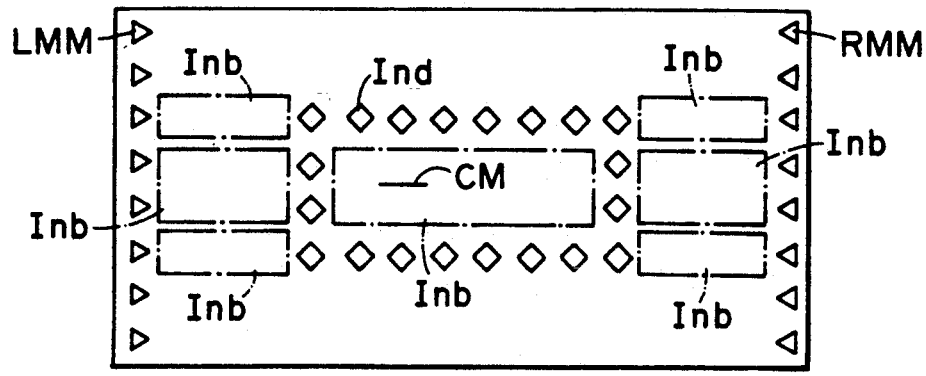
Figure 2C:
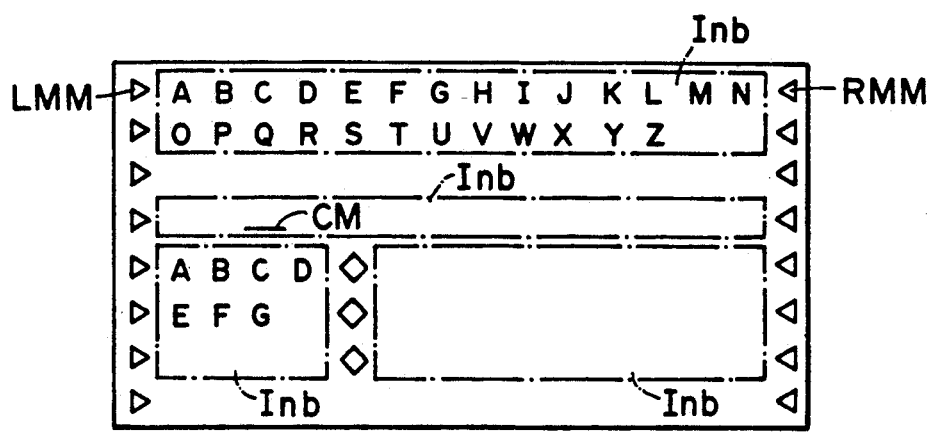

FIGS. 2 A, B and C show indent blocks displayed on the CRT.

The characters inputted from the keyboard are processed within the frame of the indent block Inb. The indent block Inb plays an important role in forming a formatted sentence such as in tabulation.

In the present embodiment, since the indent block Inb is processed in various ways for an area following a cursor (CM) position displayed on the CRT, the area of the indent block Inb defined above following a line on which the cursor CM is present is sometimes called the indent block Inb.

5. Framework Code

A general term of the three codes, indent code Ind, left margin code LMM and right margin code RMM. Those codes are correlated to frame patterns ▷, ◁ and ◊ (See FIG. 3A.)

6. Ruled Line Code

Coded representation of a partial rule pattern in the form of a graphic character. As shown in FIG. 3 A, eleven different rule patterns are correlated to the rule codes.

One embodiment of the present invention is now generally explained.

The present embodiment comprises a keyboard, a processor, a display and a printer.

All of the operations are carried out by character keys or function keys on the keyboard.

All conditions are first initialized by an initializing key to render the functions of the apparatus to be ready for execution.

When the initializing key is depressed, the left and right margin marks LMM and RMM are displayed on the display and all other marks are cleared. The cursor CM is positioned at a second column on an uppermost row to enable inputting of a character from the keyboard. The selection of an insertion input mode or an overwrite input mode is effected by depressing an insertion key or an overwrite key. In the insertion mode or overwrite mode, a character inputted from the keyboard is displayed on the display at a position at which the cursor CM is displayed. The cursor CM is stepped one position at a time whenever a character is inputted from the keyboard. When a wrong character is inputted, it can be deleted by depressing a deletion key. In this case, the succeeding characters are shifted forward by one position. The character to be deleted is specified by the cursor CM. The cursor can be stepped one position at a time by depressing a cursor key. When a character string has been inputted, a print key is depressed so that the character string is supplied to the printer. The above input/output control can be readily attained by a known technique.

The functions and the operation processes therefor of the present invention will now be explained.

The formation of the indent block Inb is first explained. The indent block Inb can be formed by overwriting or inserting the indent marks Inb on the display using the indent key. Once the indent block has been formed, the information such as characters inputted from the keyboard is all processed within the indent block Inb. Consequently, a formatted sentence such as in tabulation can be readily formed. The indent block Inb can be laterally enlarged or reduced as desired. This will be explained with reference to FIGS. 4 A, B and C.

Figures 4A, 4B, 4C:
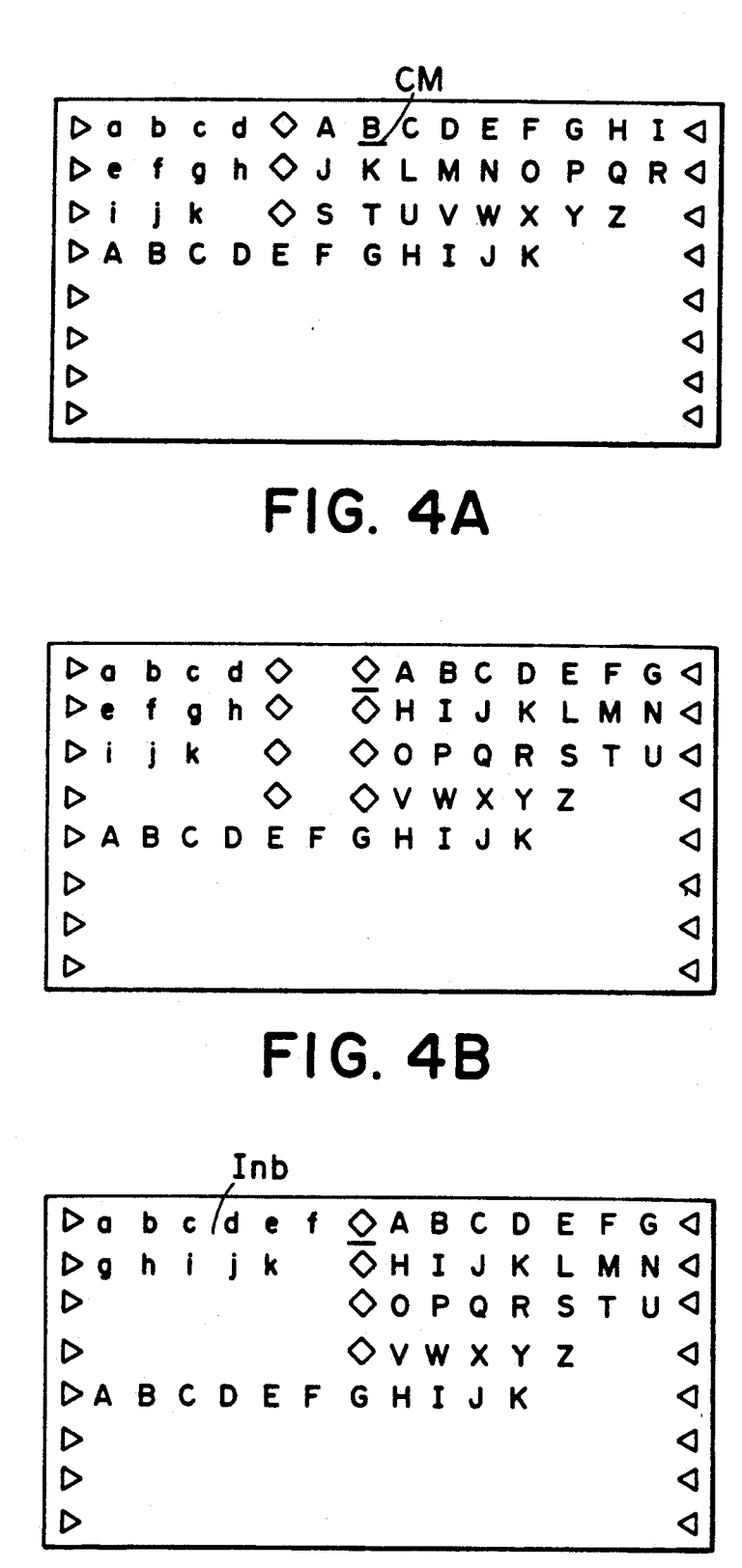

Referring to FIG. 4 A, it is assumed that a plurality of characters have been inputted in the indent block. When the cursor CM is moved to a row 1 and column 8 position, that is, a position "B" by the cursor key and the indent right shift key is depressed, the indent block in which the cursor CM is present is laterally reduced and longitudinally enlarged accordingly, as shown in FIG. 4B. When the cursor CM is positioned at the position of the indent mark Ind and the indent right shift key is depressed, the indent block Inb which is the second block to the left of the cursor CM is enlarged as shown in FIG. 4C.

Thus, when the indent right shift key is depressed once in FIG. 4A, indent block of FIG. 4B is formed, and when the indent right shift key is depressed twice in FIG. 4A, the indent block of FIG. 4C is formed.

When the indent left shift key is depressed to shift the indent mark Ind, a similar operation is carried out.

Figure 5A:
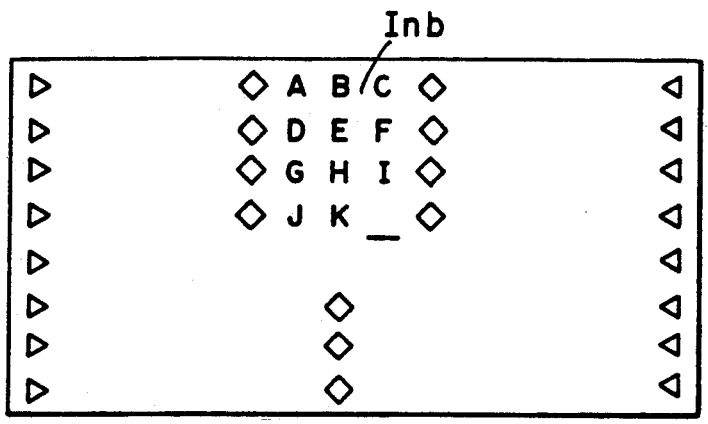
Figure 5B:
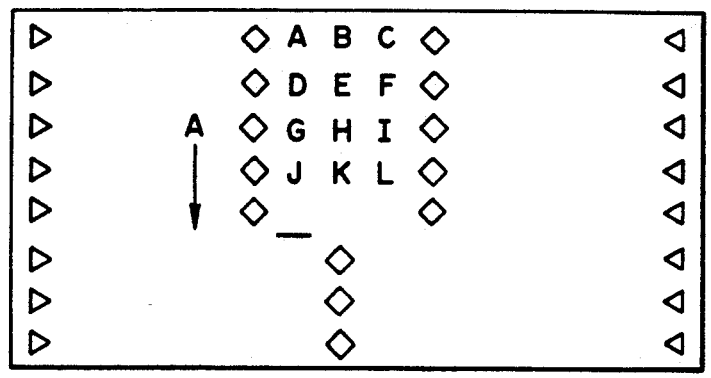
Figure 5C:
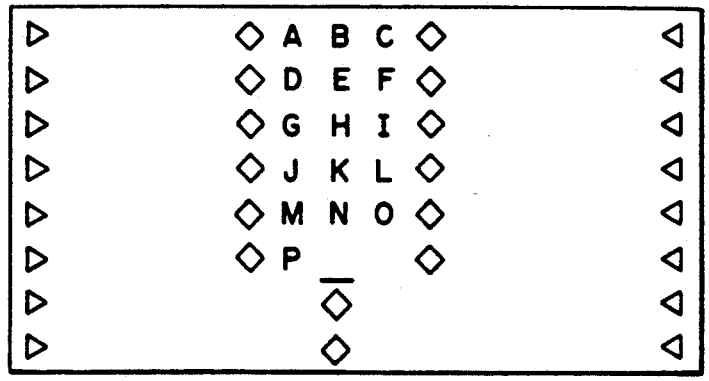

Referring to FIGS. 5A, B and C, the inputting operation of the characters is explained. Referring to FIG. 5A, it is assumed that the characters have been inputted into the indent block Inb and the cursor CM is positioned at the last position of the indent block Inb. When a character "L" is inputted in the overwrite mode in FIG. 5A, the indent block as shown in FIG. 5B is formed. That is, the indent block is automatically enlarged longitudinally (the direction of an arrow A) to prepare for an area for a next input character. When characters "MNOP" are inputted in FIG. 5B, the indent block is further enlarged as shown in FIG. 5C.

When the indent block in FIG. 5B is to be further enlarged, the lower adjacent indent block Inb must be shifted downward by one line. FIG. 5C illustrates this case.

Figure 6A:
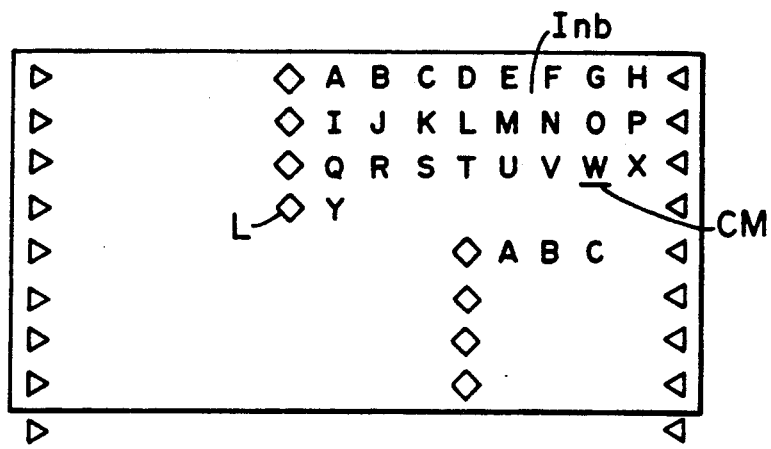
Figure 6B:
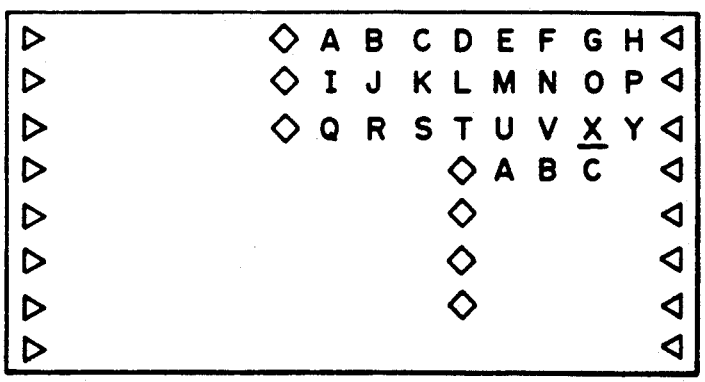

The delection of a character will now be explained. Referring to FIG. 6A, it is assumed that the characters have been inputted into the indent block Inb and the cursor CM is positioned under a character "W". When the deletion key is depressed, the succeeding characters are shifted forward by one position As a result, the line in which a character "Y" has been present now includes only the space codes, the left margin code, right margin code and the indent code. In the present embodiment, this line L is automatically deleted and the succeeding lines are shifted upward by one line.

The deletion of the indent mark Ind will now be explained.

In one method, the deletion key is used so that the indent mark is replaced by the space code.

Figures 3A, 3B:
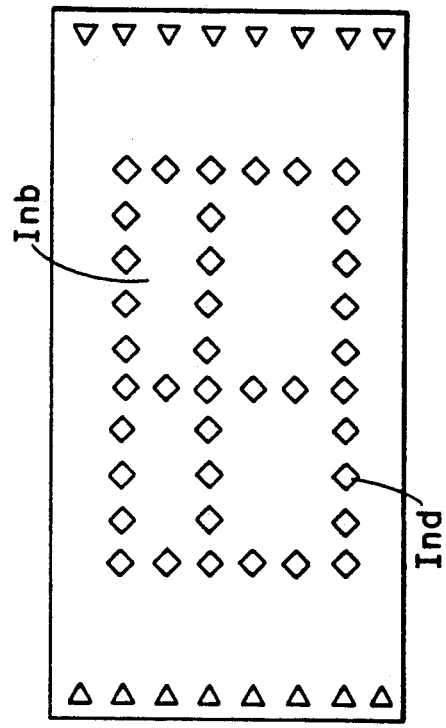
Figures 3C, 3D:
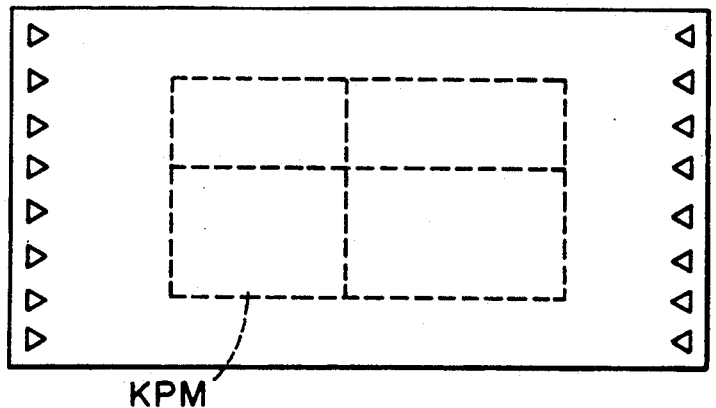

The conversion function of the indent mark and the rule pattern will now be explained. It is assumed that the indent block Inb has been formed as shown in FIG. 3B. When the indent rule conversion key is depressed, the indent marks are converted to the rule pattern as shown in FIG. 3C. In this manner, the indent marks Ind can be converted to the rule pattern RPM. By using this function and inputting a text in the area framed by the indent marks Ind and then converting it to the rule pattern, the text including the rule pattern RPM can be readily formed. This is very convenient in tabulation operations.

FIG. 3D shows a table used when the indent pattern is converted to the rule pattern. In the present embodiment, it is assumed that the cursor is not positioned to the right of the line in which the carriage return code is present in each indent block when the functions of inputting the character, shifting and deleting the indent and the carriage return key input are carried out.

The text thus inputted and edited is supplied to the printer by depressing the print key.

Figure 1:
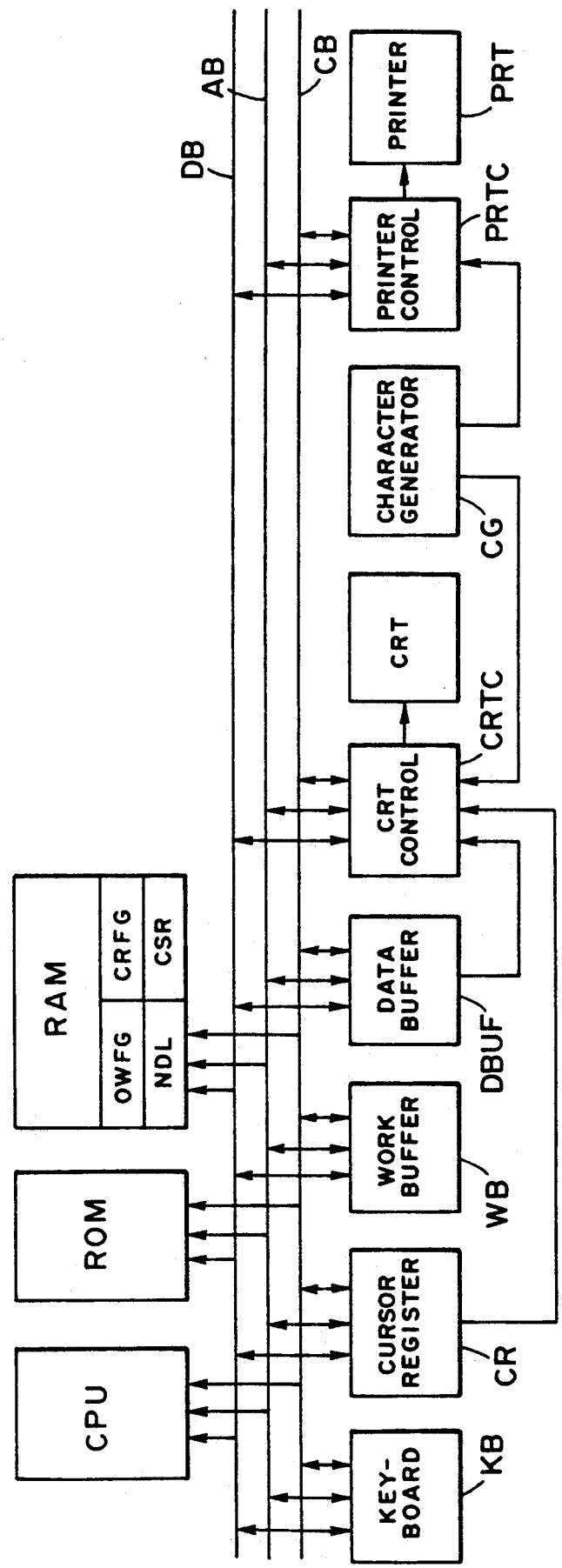
FIG. 1 shows a block diagram of one embodiment of the present invention,
FIGS. 2 A, B and C illustrate indent blocks,
FIGS. 3 A, B, C and D illustrate conversions between indent marks and rule patterns,
FIGS. 4 A, B and C illustrate modifications of frames,
FIGS. 5 A, B and C illustrate modifications of frames,
FIGS. 6 A and B illustrate modifications of frames.

FIG. 1 shows a block diagram of one embodiment of the word processor of the present invention or carrying out the function described above. KB denotes a keyboard having text inputting keys (e.g. keys arranged on a JIS keyboard) and function keys for realizing various functions of the present apparatus. The function keys include an indent key for setting the indent, an indent right shift key for shifting the indent rightward, an indent left shift key for shifting the indent leftward, an insertion key, a deletion key and an overwrite key for causing the insertion, the deletion and the overwrite of a character to be inputted, a cursor key for shifting the cursor on the CRT screen, an initialization key for causing the start of operation, a carriage return key for causing carriage return, an indent-rule conversion key for converting the indent mark to the rule mark, a rule-indent conversion key for converting the rule mark to the indent mark, and a print key for causing printing. The keyboard KB has an encoder function so that information on the depressed keys is read by a processor CPU to be described later.

CR denotes a cursor register. The content of the cursor register CR is read or data is written into the cursor register CR by the processor CPU. A CRT controller CRTC to be described later has a function of displaying the cursor at a position on the display CRT corresponding to the address stored in the cursor register CR. The information stored in the cursor register CR is a serial number ranging from 1 to 128, and the CRT controller CRTC translates the serial number to a row number and a column number for displaying the cursor.

WB denotes a work buffer for temporarily storing information in the indent block Inb. A seven-word parameter is stored at a header portion of the buffer. It has a capacity of 16×9 words +α. It can be read and written by the processor CPU.

DBUF denotes a data buffer for storing text information inputted from the keyboard KB. The information stored therein is displayed on the display CRT by the CRT controller CRTC. It is used as a refresh memory for the display CRT. It can be read and written by the processor CPU. It has a capacity of 16×9 words, only one former half 16×8 words of which are displayed on the display CRT.

CRTC denotes the CRT controller which controls the display of characters on the display CRT in accordance with the information stored in the data buffer DBUF and the display of the cursor on the display CRT in accordance with the information stored in the cursor register CR.

It is assumed that the characters are displayed in eight lines each comprising 16 characters and the displayed characters are correlated to the content of the data buffer DBUF.

In displaying the characters, a character generator to be described later is referred to for conversion of the character codes to character patterns. A specific method therefor is known per se.

CRT denotes the display which displays the characters and the cursor under the control of the CRT controller CRTC.

CG denotes the character generator which is used to display the characters on the display CRT and to print out the characters with a printer PRT. It is referred to by the CRT controller CRTC and a printer controller PRTC to be described later.

PRTC denotes the printer controller which converts character code information from the processor CPU to character pattern by referring to the character generator CG and supplies the character patterns to the printer PRT. The printer controller PRTC also converts the rule code to the rule pattern. Preferably, it has a function of generating a pattern of lines which are continuous between adjacent lines and between adjacent character positions.

PRT denotes the printer which prints out the characters in accordance with the information from the printer controller PRTC.

CPU denotes the microprocessor which carries out the arithmetic operations and logical functions. It controls AB, CB and DB described below.

AB denotes an address bus which transfers a signal indicating an element to be controlled.

CB denotes a control bus which supplies control signals to the elements to be controlled.

DB denotes a data bus which transfers data.

Figure 7:
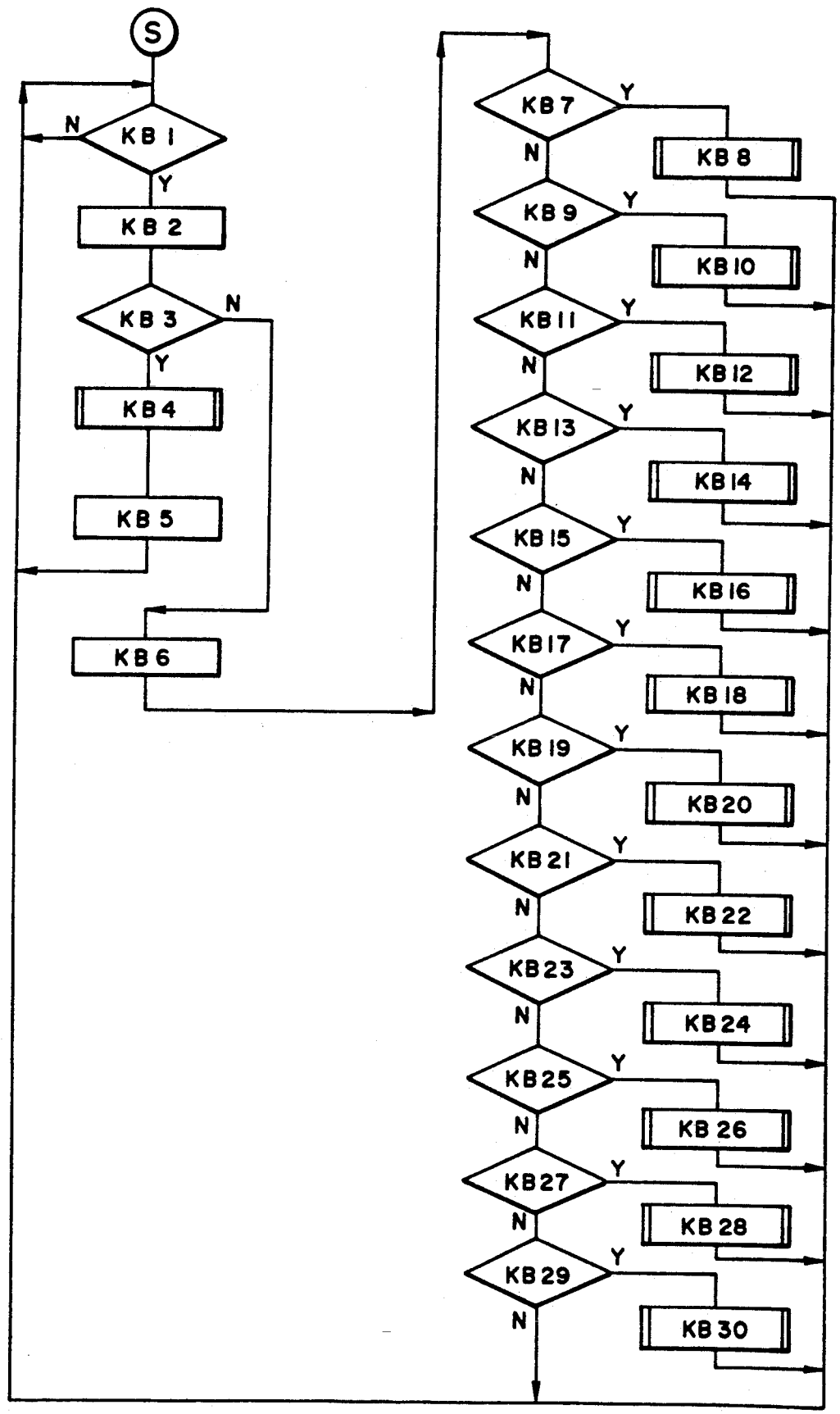
FIG. 7 shows a control procedure of keying.

ROM denotes a control memory which stores control procedures shown in FIG. 7 et seq.

RAM denotes a random access memory which is used to temporarily store various data such as a carriage return flag CRFG, an overwrite flag OWFG, a new data line number register NDL and a cursor save register CSR.

The operation of the present embodiment will now be explained.

In the present embodiment, it is assumed that the keyboard operation is automatically activated upon power-on. The respective processes will be explained in detail with reference to flow charts of FIG. 7 et seq.

When the keys on the keyboard KB are keyed, operation keys are discriminated in the following sequence, corresponding processes are carried out and the process assumes a keying waiting status.

In a step KB1, it is determined if an input was supplied from the keyboard KB. If not, the process goes back to the keying waiting status, and if the input was supplied, the process goes to a step KB2 where data from the keyboard KB is read. In a step KB3, it is determined if the read data is from the carriage return key, and if it is, the carriage return input process is carried out in a step KB4 and the flag CRFG is set to "1" in a step KB5 and the process goes back to the keying waiting status. On the other hand, if the decision in the step KB3 is NO, the flag CRFG is set to "0" in a step KB6 and the process goes to a next key discrimination step. The carriage return key input process in the step KB4 will be further described.

Figure 8:
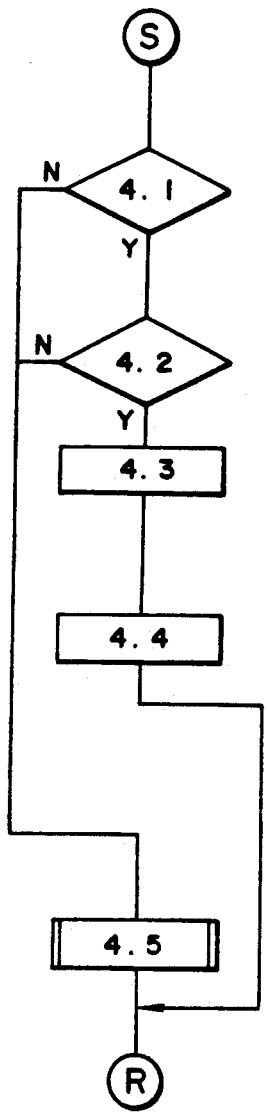
FIG. 8 shows a carriage return procedure.
Figure 9:
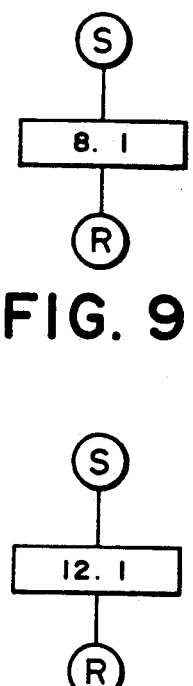
FIG. 9 shows an indent input process.
Figure 10:
FIG. 10 shows an overwrite key input process.
Figure 11:
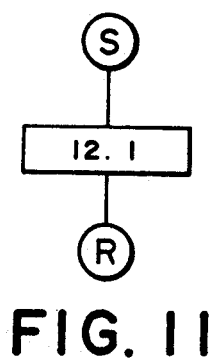
FIG. 11 shows an insertion key input process.

FIG. 8 shows a detail of the carriage return key input process. In the present embodiment, by keying the carriage return key sequentially, the frame can be expanded. The respective steps of the process are described below.

Step 4.1 Is CRFG set?
Step 4.2 Is a current cursor position immediately right to the indent mark?
Step 4.3 Convert the indent mark immediately left of the present cursor position to a space mark.
Step 4.4 Load a number into the cursor register to shift the cursor to the position immediately right of the indent mark which is on the left of and closest to the current cursor position or the left margin mark.
Step 4.5 Character key input process 16.

While the frame is modified by the carriage return key in the present embodiment, other key may have the same function.

Referring again to FIG. 7, the keyboard process of FIG. 7 is further explained.

Figure 12:
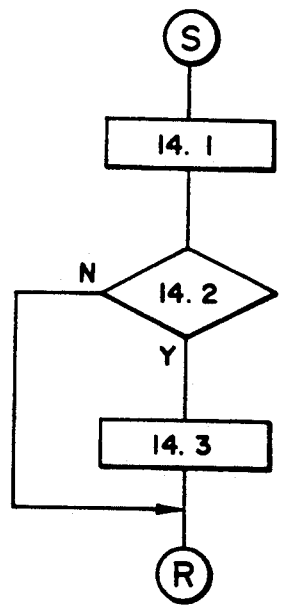
FIG. 12 shows a cursor key input process,
FIG. 13 A shows a character key input process,
FIG. 13 B shows a character overwrite process,
FIG. 14 A shows an indent block save process,
FIG. 14 B shows a data flow.

After the flag CRFG has been reset in the step KB6, the process goes to a step KB7 where it is determined if the indent key has been keyed. If the decision is YES, an indent key input process is carried out in a step KB8. The indent mark is displayed at the current cursor position. After this process, the process waits for key input. If the decision in the step KB7 is NO, the process goes to a step KB9 where it is determined if the overwrite key has been keyed If the decision is YES, the overwrite flag OWFG is set to "1" in a step KB10 and the process waits for key input. If the decision is NO, the process goes to a step KB11 where it is determined if the insertion key has been keyed. If the decision is YES, the insertion key input process is carried out. The overwrite flag OWFG is reset and the process waits for key input. If the decision in the step KB11 is NO, the process goes to a process KB13 where it is determined if the cursor key has been keyed. If the decision is YES, the process goes to a step KB14 where the cursor is sequentially stepped on the CRT screen. When the cursor reaches the last column of the last row, it is returned to the left top position. This process is carried out in the following steps shown in FIG. 12.

14.1 Increment the cursor register CR.
14.2 Is the content of the cursor register CR larger than 128?
14.3 Set the content of the cursor register CR to 1.

Figure 13A:
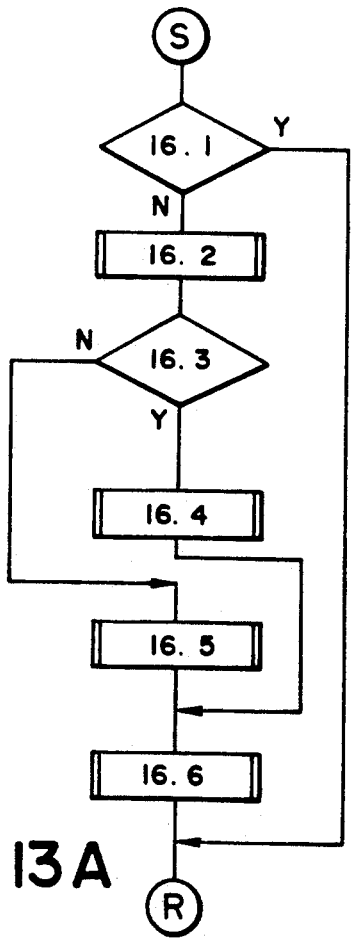

After the above steps, the process waits for key input. If the decision in the step KB13 is NO, the process goes to a step KB15 where it is determined if the character key has been keyed. If the decision is YES, the process, goes to a step KB16 where the following control steps are carried out as shown in FIG. 13A.

Is the indent mark or the left or right margin mark present at the current cursor position?
16.2 Save the indent block.
16.3 Is it the overwrite mode? (Refer the overwrite flag)
16.4 Overwrite
16.5 Insert
16.6 Restore the indent block The above steps carry out the following operations.

16.1 The character key input is made effective only when the cursor is present in the indent block. The process is invalid when the cursor is present at the position of the indent mark or the left or right margin mark.

16.2 Since all of the input processes are carried out in the work buffer WB, the information in the indent block in which the cursor is present is transferred to the work buffer WB. (The process is to be carried out for the lines succeeding to the line of the cursor. Various parameters are set at the header of the work buffer WB.

16.3~16.4 If it is the overwrite mode, the overwrite process is carried out in the work buffer WB.

16.5 If it is the insertion mode, the insertion process is carried out in the work buffer WB.

16.6 The information in the work buffer WB to which the character input process has completed is restored to the original indent block. The above process is further explained below.

Figure 13B:
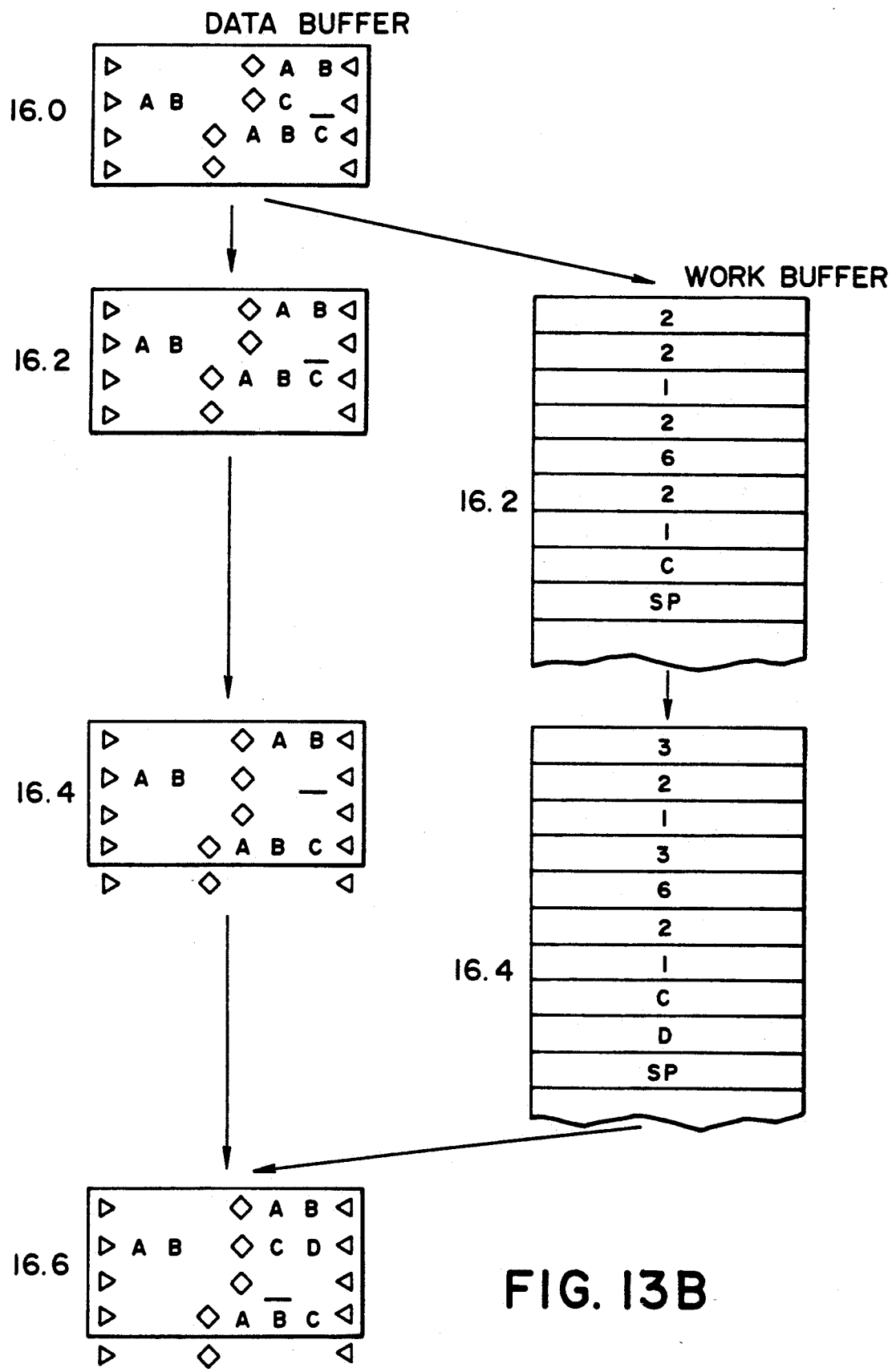

FIG. 13B shows an example of character overwrite. It is assumed that an initial state of the data buffer DBUF is that shown by 16.0. In the illustrated example, the data buffer DBUF of eight columns by four rows is displayed on the display CRT for the convenience of illustration. After the step 16.2 has been executed, the states of the data buffer DBUF and the work buffer WB change as shown by 16.2. The data in the data buffer DBUF has been transferred to the work buffer WB. In the overwrite process in the step 16.4, the overwrite process is carried out in the work buffer WB. The differences between the contents 16.2 and 16.4 of the work buffer WB are that the character D has been added after the character C, the first word (data length) of the work buffer WB has been incremented and the fourth word (cursor address) of the work buffer WB has been incremented. In the step 16.4, it is determined if the information stored in the work buffer WB can be completely restored to the corresponding indent block. In the present example, the capacity of the indent block shown by 16.0 is two characters and the information stored in the work buffer WB has increased to three characters because the cursor was shifted. Accordingly, the indent block is longitudinally expanded so that the information in the work buffer WB can be completely stored, as shown by the data buffer DBUF of 16.4. In the step 16.6, the information in the work buffer after the overwrite process is completely restored to the expanded indent block, as shown by 16.6.

Figure 14A:
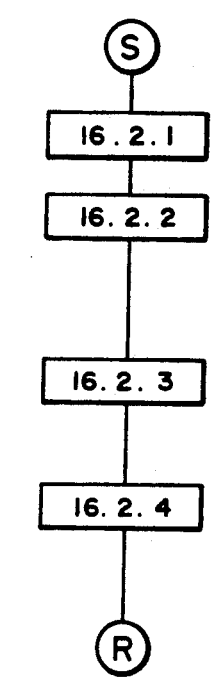

The indent block save process in the step 16.2 is further explained below with reference to FIG. 14A. This step includes the following operations.

16.2.1 Load space codes to all data storage areas of the work buffer WB.

16.2.1 Transfer the content of the data buffer succeeding the line in which the cursor is present, in the indent block in which the cursor is present, to the work buffer WB (except the space code following to the carriage return code).

16.2.3 Fill the indent block with the space codes.

16.2.4 Write the following parameters at the header of the work buffer WB.

1. Length of data written into the work buffer WB. (The length should include the cursor position.)
2. Lateral width of the indent.
3. Longitudinal width of the indent. (The number of rows of the indent block)
4. Address in the work buffer corresponding to the cursor register.
5. Leading column number of the indent block on the data buffer DBUF.
6. Leading row number of the indent block on the data buffer DBUF.
7. The number of rows of data. (The number of rows of the indent block less the number of all-space rows)

The above steps have the following functions.

16.2.1 Initialize the work buffer WB with the space codes.

16.2.2 Transfer the information in the indent block to the work buffer WB.

16.2.3 Fill the indent block after the transfer with the space codes.

16.2.4 Write the characteristics of the indent blocks into the header of the work buffer WB. The parameters in the header are updated when the content of the work buffer WB is updated and they are useful in restoring the content of the work buffer WB to the data buffer DBUF.

Figure 14B:
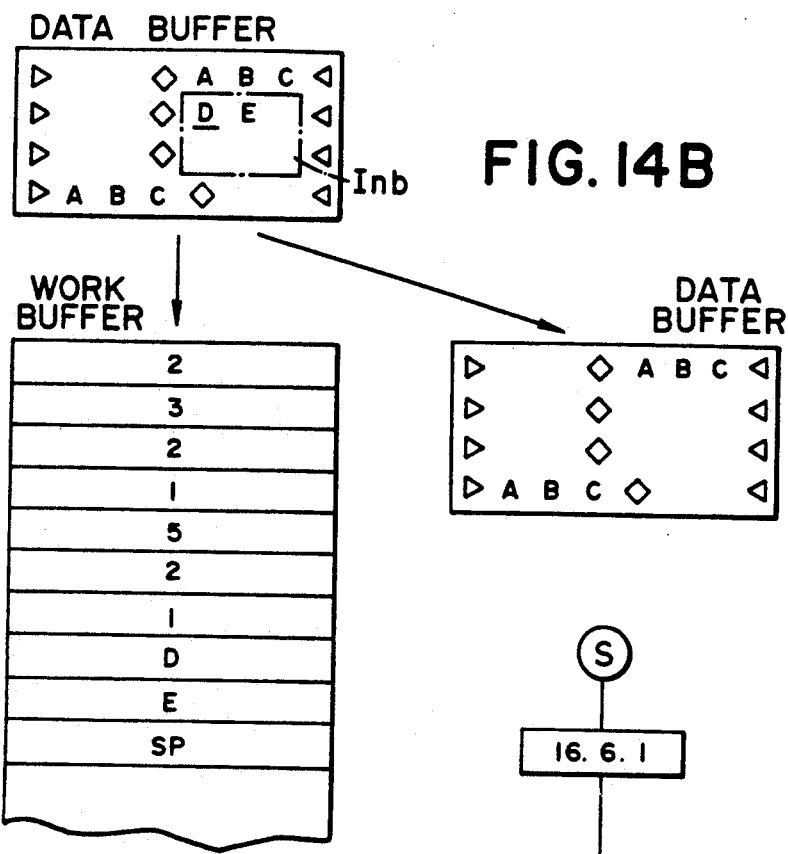

FIG. 14B shows an example of the present process. The parameters saved in the work buffer in the step 16.2.4 are as follows.

1st word: Data length

The length of data written into the work buffer. The length does not include the space code following the carriage return code. It also does not include the space code following the end of the indent block. The cursor position is regarded as a code other than the space code if present at that position even if the space code is present at that position.

2nd word: Lateral width

The lateral width of the indent block.

3rd word: Longitudinal width

The longitudinal width of the indent block.

4th word: Cursor

The cursor indicates the stored position of the data indicated by the cursor, in the work buffer WB. The minimum value is 1 and the maximum value is same as that of the first word.

5th word: Beginning column of the indent block.

It defines the position of the indent block on the data buffer DBUF. It indicates the column number in the data buffer DBUF of the leading character of the indent block.

6th word: Beginning row of the indent block.

It defines to position of the indent block on the data buffer DBUF. It indicates the row number in the data buffer DBUF of the leading character of the indent block.

7th word: Data row

The longitudinal width of the indent block excluding the last all-space rows. The space code in the cursor position is regarded as the character code. The minimum number is 1 and the maximum number is equal to that of the third word.

Figure 15:
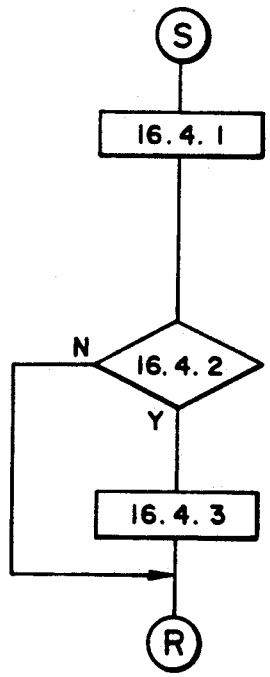
FIG. 15 shows an overwrite process.
Figure 16:
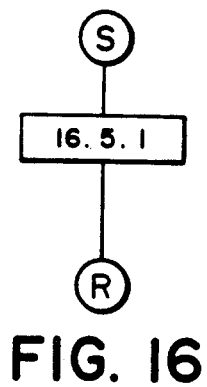
FIG. 16 shows an insertion process.

The control procedures for the overwrite process in the step 16.4 are described below and shown in FIG. 15.

16.4.1 The data is overwritten at the data position in the work buffer indicated by the fourth word (cursor) of the work buffer WB, and the value of the fourth word (cursor) of the work buffer WB is updated.

16.4.2 Is the value of the fourth word (cursor) of the work buffer WB larger than the first word (data length) of the work buffer WB?

16.4.3 Replace the value of the first word (data length) of the work buffer WB with the value of the fourth word (cursor) of the work buffer WB.

The above steps are further discussed below.

16.4.1 Write data into the corresponding position of the work buffer update the value of the fourth word of the work buffer WB to advance the cursor.

16.4.2~16.4.3 When the position value of the cursor is larger than the data length in the first word of the work buffer, the position of the cursor or the value of the fourth word of the work buffer WB is transferred to the first word of the work buffer WB. Thus, the data length is determined by including the space at the cursor position in the data.

The step 16.5 is further discussed below.

In this step, the data is inserted into the data position in the work buffer WB indicated by the fourth word (cursor) of the work buffer WB, and the values of the first word (data length) and the fourth word (cursor) of the work buffer WB are updated (incremented by one).

In the step, the insertion process is carried out in the work buffer WB and the first word (data length) and the fourth data (cursor) of the work buffer WB are incremented.

Figure 17:
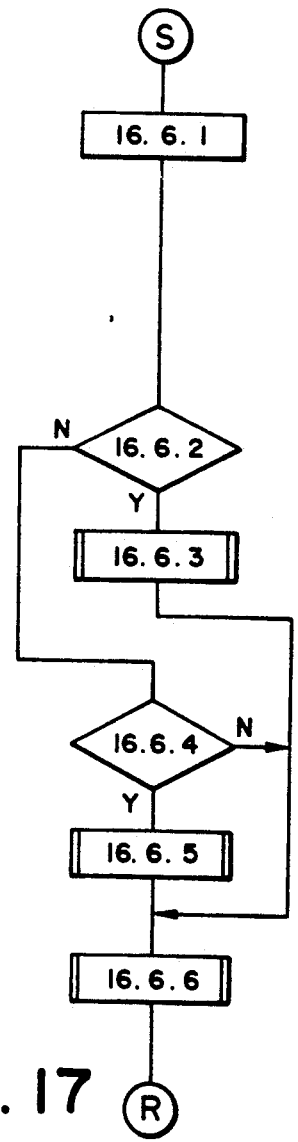
FIG. 17 shows an indent block restore process,
FIG. 18 A shows an indent block enlarging process,
FIG. 18 B shows a data flow,
FIG. 19 A shows a line insertion process,
FIG. 19 B shows a data flow,
FIG. 20 A shows a space line shift process,
FIG. 20 B shows a data flow.

The indent block restoring process 16.6 shown in FIG. 13A is further explained below. FIG. 17 illustrates the process.

16.6.1 The number of rows necessary to store the data of the data length indicated by the first word of the work buffer WB when the lateral width is given by the second word of the work buffer WB is determined and that number is defined as the new number of rows of data. If the carriage return code is present in the data, the increase of the number of rows by the carriage return must be taken into consideration.

16.6.2 Is the new number of rows of data larger than the third word (longitudinal width) of the work buffer WB?

16.6.3 Expand the indent block.

16.6.4 Is the new number of rows of data in a new number of rows of data register NDR smaller than the seventh word (the number of rows of data) of the work buffer WB?

16.6.5 Reduce the indent block.

16.6.6 Write to the data buffer DBUF.

The steps 16.6.1~16.6.6 are further explained below.

16.6.1 The header of the work buffer WB is referred to in order to determine the number of rows necessary to store the data in the work buffer WB into the data buffer DBUF.

In determining the number of rows, the lateral width of the indent block indicated by the second word of the work buffer WB is referred.

If the carriage return code CR is present, the increase of the number of rows by the carriage return must be taken into consideration.

16.6.2~16.6.3 The number of rows determined is compared with the initial longitudinal width of the indent block, and if the number of rows is larger than the longitudinal width, the indent block is expanded longitudinally to assume the data entry.

16.6.4~16.6.5 The number of rows determined is compared with the initial number of rows of data (which is not the initial longitudinal width but the longitudinal width less the number of all-space rows), and if the number of rows determined is smaller than the initial number of rows of data, the indent block is reduced longitudinally.

16.6.6 The content of the work buffer is transferred to the reformed indent block by referring the parameters at the header of the work buffer WB.

The indent block expanding process in the step 16.6.3 is further explained below with reference to FIG. 18A.

16.6.3.1 Insert row (lines).

16.6.3.2 Shift space rows (lines).

16.6.3.3 Is the shift repeated by the number of times equal to the new number of rows of data less the third word (longitudinal width) of the work buffer WB?

The functions of the above steps are as follows.

16.6.3.1 The line is inserted in the row (line) in which the cursor is present. The line of data inserted includes the left margin mark, the right margin mark and the indent mark which is set in the same manner as that of the immediately upper line. The other positions are filled with the space codes.

16.6.3.2 As a result of the line insertion, the character string which has been continuous is broken so that the continuity of the text is no longer maintained. Accordingly, the data following to the inserted line is shifted up by one line for each indent.

16.6.3.3 The steps 16.6.3.1 and 16.6.3.2 are repeated by the number of times equal to the number of rows to be expanded.

The data arrangement after the above step is shown in FIG. 18B.

FIG. 18B shows an example of the indent block expansion process. Chart 16.6.3.1 shows a pattern after the line insertion and chart 16.6.3.2 shows that the space rows inserted for each indent have been shifted downward. As seen from the chart 16.6.3.2, the space rows are distributed ununiformly in the respective indents and not located in the same row As a result, the indent block is expanded while maintaining the continuity of the text in each indent block.

The line insertion process in the step 16.6.3.1 is further explained below with reference to FIG. 19A. This process includes the following steps.

16.6.3.1.1 All rows in the data buffer following the row in which the cursor is present are shifted downward by one line and the space codes are filled in the newly formed row.

16.6.3.1.2 The left margin code, the indent code and the right margin code of the row preceeding to the newly formed row are copied to the newly formed row at the same positions.

In the above steps, the row including the space code at the current cursor position is inserted, and the left margin mark, the right margin mark and the indent mark are written at the same positions as those of the preceeding row.

Figure 20A:
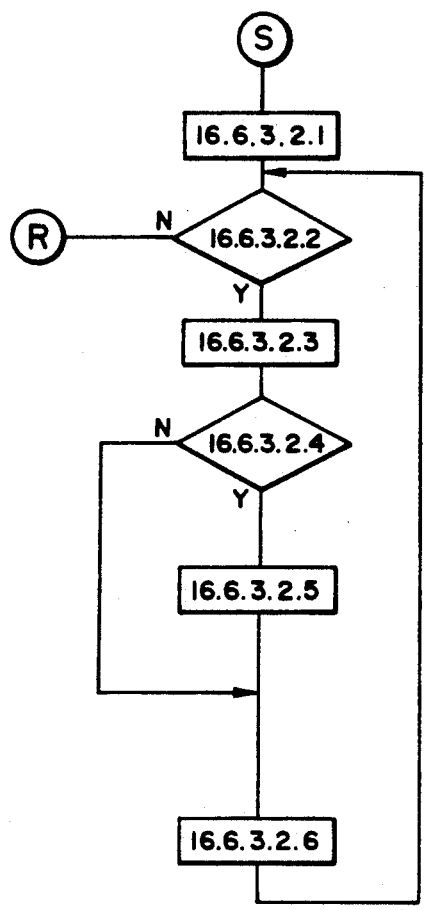
Figure 20B:
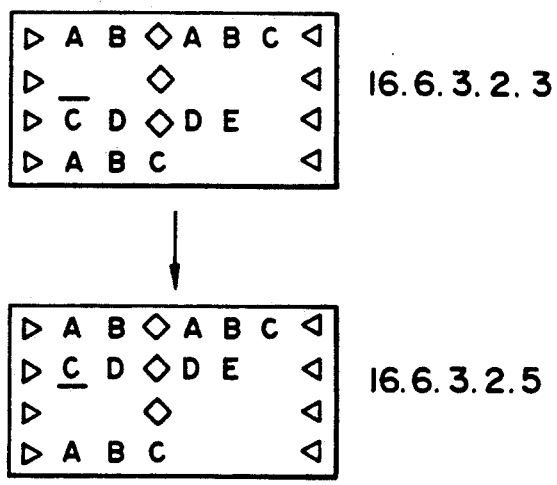

The space row shift process of the step 16.6.3.2 is further explained below. This process includes the steps shown in FIG. 20A.

6.3.2.1 Insert the indent block at the leftmost end of the row in which the cursor is present.

16.6.3.2.2 Is the indent block present?

16.6.3.2.3 Shift the cursor to the leading position of the indent block.

16.6.3.2.4 Does the row of the indent block in which the cursor is present include the space codes in all positions?

16.6.3.2.5 Delete the row of the indent block in which the cursor is present and shift the rows by one line until the last row of the indent block is shifted. Fill the space codes in the last row.

16.6.3.2.6 Insert the next indent block on the right hand.

In the above steps, the indent blocks are sequentially processed starting from the left indent block by the steps 16.6.3.2.1, 16.6.3.2.2 and 16.6.3.2.6 until all of the indent blocks are processed.

The space rows in the respective indent blocks are shifted to the lowermost row of the indent block by the steps 16.6.3.2.3 through 16.6.3.2.5. Since this process is carried out one for each indent block, the position of the space row shifted to the lowermost row differs from indent block to indent block.

Figure 21:
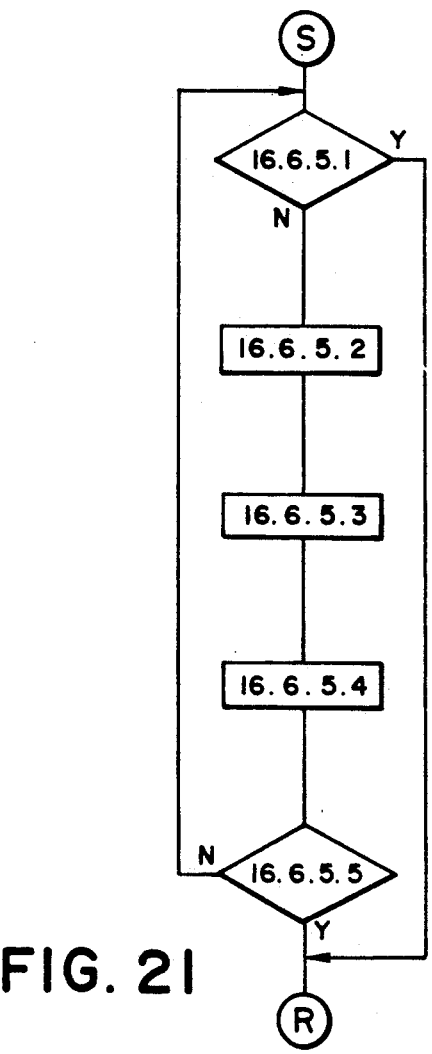
FIG. 21 shows an indent block reducing process,
FIG. 22 A shows a data buffer write process,
FIG. 22 B shows a data flow,
FIG. 23 A shows a deletion key input process,
FIG. 23 B shows a data flow for character deletion.

Detail of the indent block reduction process in the step 16.6.5 is shown in FIG. 21. This step is described below.

16.6.5.1 Is any code other than the left margin mark, the right margin mark, the space code and the indent code present in the last row of the indent block?

16.6.5.2 Delete the last row of the indent block and shift the data following thereto by one line (not by indent block).

16.6.5.3 Fill the space codes to all positions of the data buffer DBUF corresponding to the last row.

16.6.5.4 Write the left margin code and the right margin code to the last row of the data buffer.

16.6.5.5 Has the above step been repeated by the number of times equal to the seventh word (the number of rows of data) of the work buffer less the new number of rows of data?

The above steps 16.6.5.1 through 16.6.5.5 have the following functions.

16.6.5.1 Check if the code other than the left margin code, right margin code, indent mark and the space code is included in the last row of the indent block or the adjacent indent block. If it is not included, go to the next step.

16.6.5.2 Delete the row checked in the step 16.6.5.1 and shift the following rows upward (not by the indent block but include the left and right margins)

16.6.5.3~16.6.5.4 Write the left and right margin codes and the space codes in the positions of the data buffer corresponding to the last row.

16.6.5.5 Repeat the reduction process by the number of times as required.

Figure 22A:
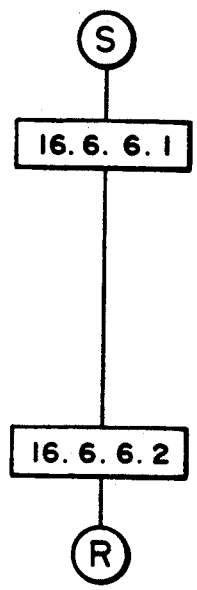
Figure 22B:
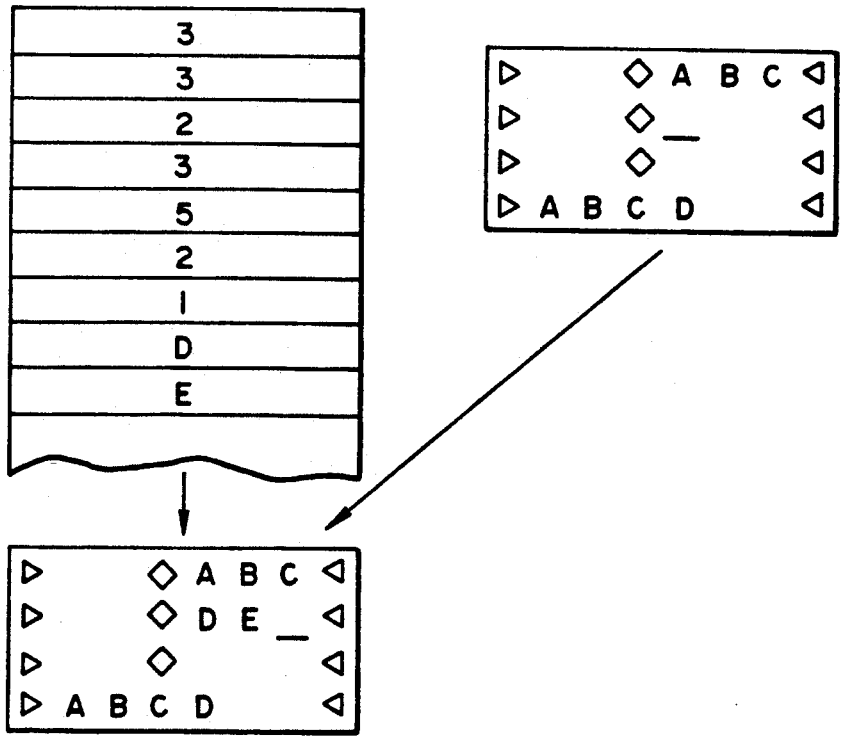

The data buffer write process in the step 16.6.6 is further discussed with reference to FIG. 22.

16.6.6.1 The data in the work buffer is transferred to the data buffer in accordance with the parameters stored at the header of the work buffer WB. (If the carriage return code is present, the carriage return is carried out). The portion of the data which exceeds the indent block is thrown away.

16.6.6 2 Load the address in the data buffer corresponding to the fourth word (cursor) of the work buffer into the cursor register (If the content exceeds 128, it is set to 1).

The above steps 16.6.6.1 to 16.6.6.2 function as follows.

16.6.6.1 Transfer the content of the work buffer to the data buffer. The length of data to be transferred is indicated by the first word, the lateral width of the indent block to be transferred is indicated by the second word, and the position in the data buffer DBUF of the indent block to be transferred is indicated by the fifth and sixth words. The fifth word indicates the column number and the sixth word indicates the row number. The leading character of the indent block is positioned at this location.

16.6.6.2 The cursor address is loaded to the cursor register.

The address at which the cursor is to be present is indicated by the fourth word of the work buffer WB.

This address is translated to the address on the data buffer before it is loaded to the cursor register CR.

Figure 23A:
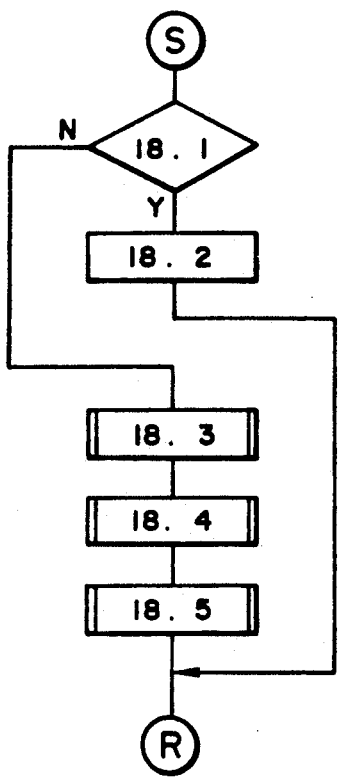

When the above process has been completed, the character process in the step KB16 in FIG. 7 is terminated and the process waits for key input If the decision in the step KB15 is NO, the process goes to the step KB17 where it is determined if the deletion key has been keyed. If the decision is YES, the deletion key input process shown in FIG. 23A is carried out. The steps thereof are as follows

18.1 Is the indent mark present at the current cursor position?

18.2 Convert the address in the cursor register corresponding to the current cursor position to the space code.

18.3 Save the indent block (16.2)

18.4 Delete

18.5 Restore the indent block list (16.6)

[Note]: This process is ineffective when the cursor is on the left or right margin.

The above steps function as follows.

18.1 When the cursor is on the indent mark, the process goes to the step 18.2, and when the cursor is not on the indent mark, the process goes to the step 18.3.

18.2 Convert the code at the cursor position to the space code.

18.3 Save the indent block to the work buffer (16.2).

18.4 Delete on the work buffer.

18.5 Restore the content of the work buffer WB on which the delete process was carried out to the data buffer DBUF.

Figure 23B:
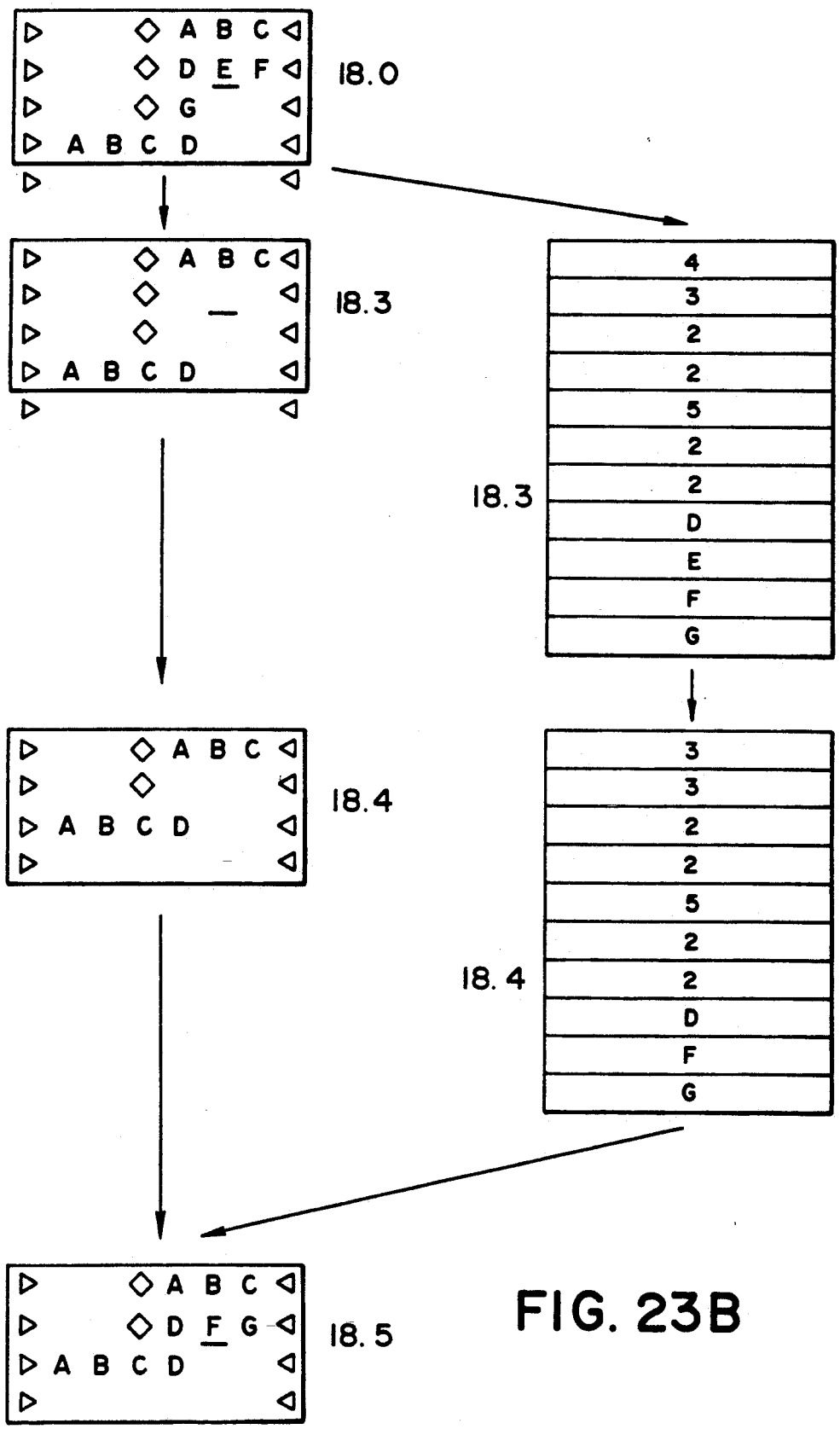

FIG. 23B shows an example of the deletion key input process. The step numbers are shown for the respective processes. The indent block save process 18.3 and the indent block restore process 18.5 have been described in connection with the steps 16.2 and 16.6, respectively. The process 18.4 is the deletion process on the work buffer WB.

Figure 24:
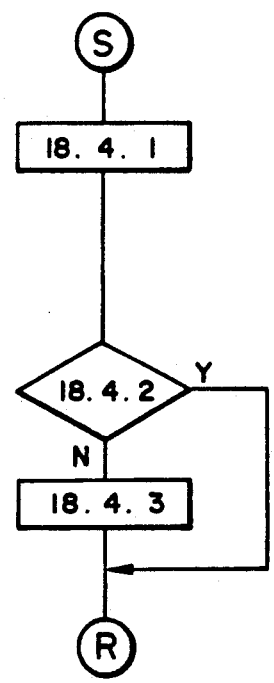
FIG. 24 shows a deletion process,
FIG. 25 A shows an indent right shift key input process,
FIG. 25 B shows a data flow,
FIG. 25 C shows a data flow.

The deletion process includes three steps as shown in FIG. 24 and described below.

18.4.1 Delete the data in the work buffer WB indicated by the fourth word (cursor) of the work buffer WB. The data following that position is shifted forward by one position.

18.4.2 Is the value of the fourth word (cursor) of the work buffer WB equal to the value of the first word (data length)?

18.4.3 Decrement the first word (data length) of the work buffer WB by one.

The above steps function as follows.

18.4.1 The data in the work buffer WB indicated by the fourth word of the work buffer WB is deleted and the following data is shifted forward.

18.4.2~18.4.3 In the deletion process, the cursor position is not moved. Accordingly, the value of the first word (data length) of the work buffer WB is decremented by one provided that the decremented value is not smaller than the value of the fourth word (cursor).

Figure 25A:
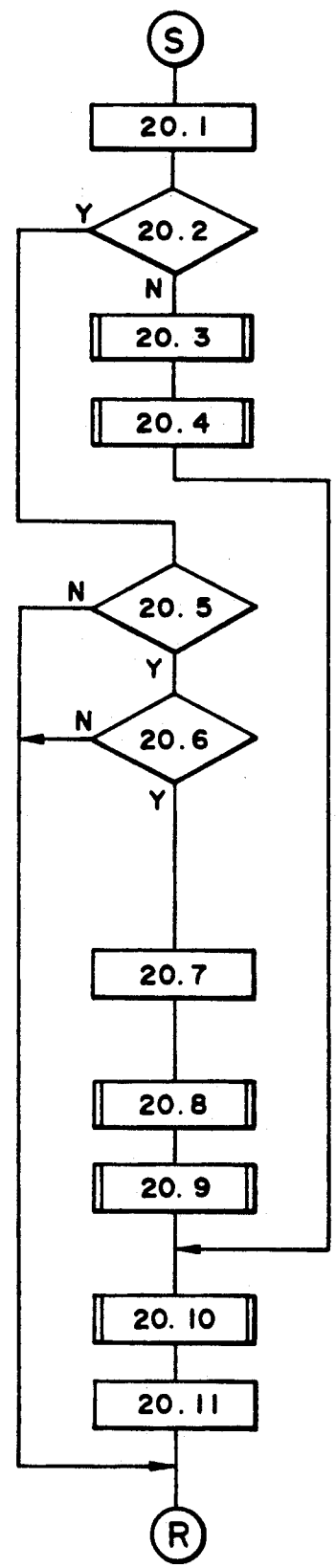

When the above process has been completed, the process waits for key input. If the decision in the step KB17 is NO, the process goes to the step 19 where it is determined if the indent right shift key has been keyed. If the decision is YES, the indent right shift key input process as shown in FIG. 25A is carried out.

20.1 Save the current cursor position.

20.2 Is the present cursor position at the indent code position?

20.3 Save the indent block (16.2).

20.4 Reduce the indent block laterally.

20.5 Is another indent block present on the left of the current cursor position?

20.6 Is the longitudinal width of the first indent block on the immediate left of the current cursor equal to the longitudinal width of the second indent block on the further left? (The comparison is made for the rows following to the row in which the cursor is present)

20.7 Shift the cursor to the leftmost end of the second indent block.

20.8 Save the indent block (16.2).

20.9 Expand the indent block laterally.

20.10 Restore the indent block (16.6).

20.11 Return the cursor to the saved cursor position.

[Note 1]: The indent left shift key input process 22 is identical to the above process except that the left and the right are interchanged.

[Note 2]: In the present process, it is assumed that the cursor is not positioned on the left or right margin.

The above steps function as follows.

20.1 Save the current cursor position to the cursor position save register.

20.2 When the cursor is on the character, the process goes to the step 20.3, and when the cursor is on the indent mark, the process goes to the step 20.5.

20.3 Save the indent block (16.2).

20.4 Reduce the indent block on the work buffer.

The process then goes to the step 20.10.

20.5~20.6 When two indent blocks are present on the left of the cursor position and the longitudinal widths of those two indent blocks are equal, the process goes to the step 20.7.

20.7 Shift the cursor to the leading character position of the indent block which is on the left of those two indent blocks.

20.8 Save the indent block (16.2).

20.9 Expand the indent block on the work buffer.

20.10 Restore the indent block (16.6).

20.11 Restore the cursor position address saved in the cursor position save register CSR to the cursor register CR.

Figure 25B:
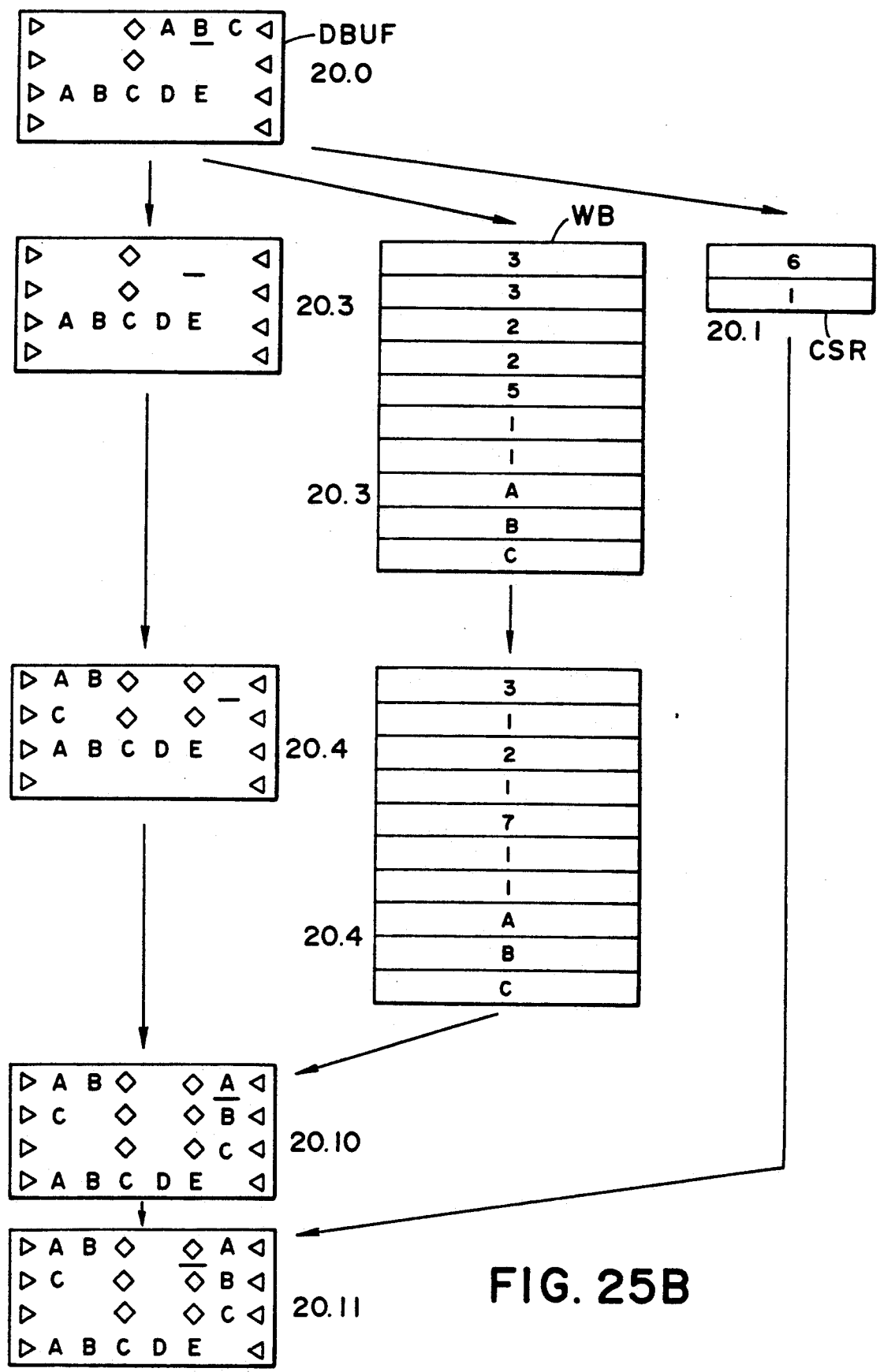

FIG. 25B shows an example where the cursor is positioned on the character. In this example, the indent block is reduced laterally by the indent right shift key. Chart 20.4 illustrates the reduction process of the indent block by using the work buffer WB.

Figure 25C:
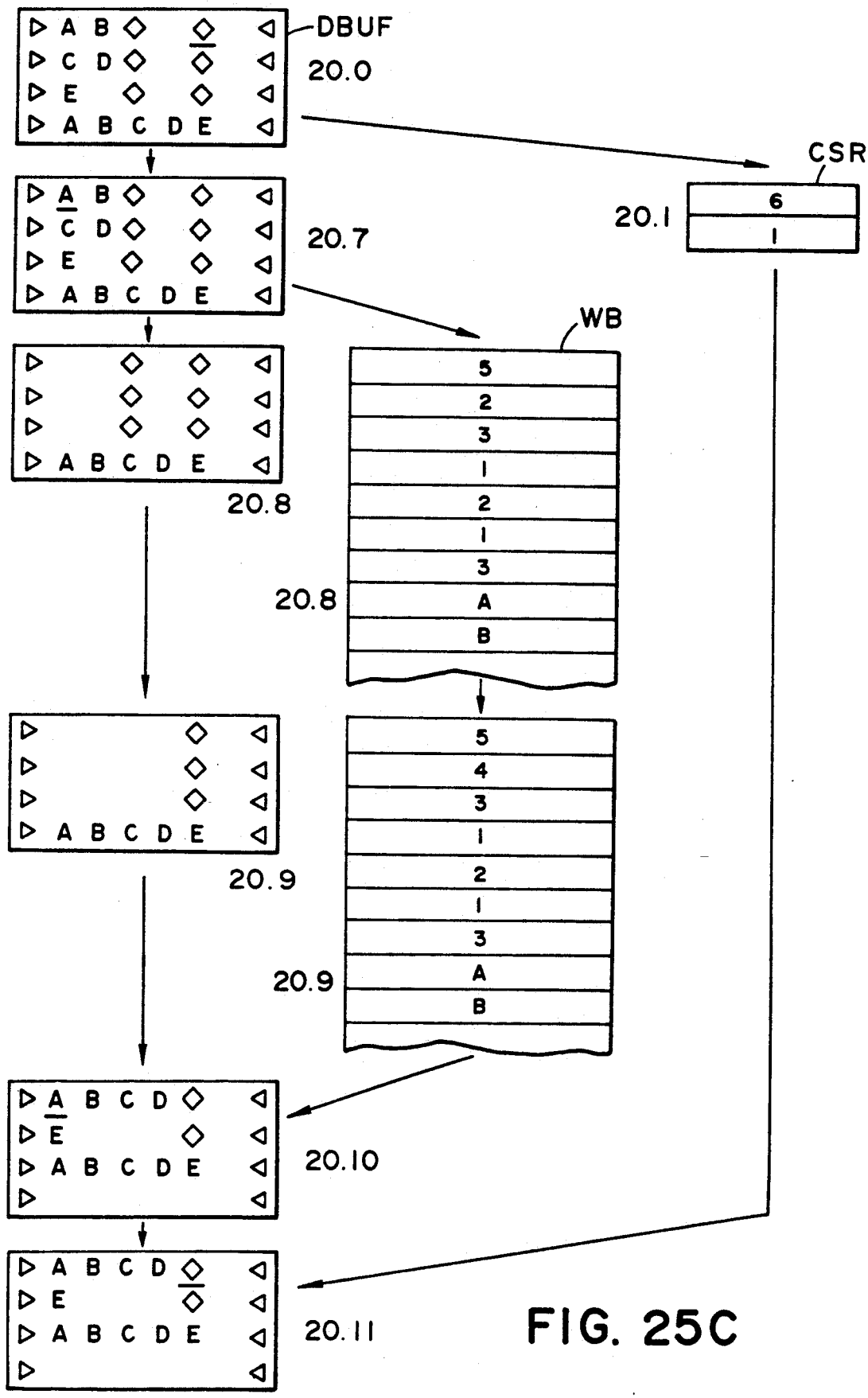

FIG. 25C shows an example where the cursor is positioned on an indent mark. In this example, the indent block is expanded laterally by the indent right shift key. Chart 20.9 illustrates the expansion process of the indent block by using the work buffer WB.

Figure 26:
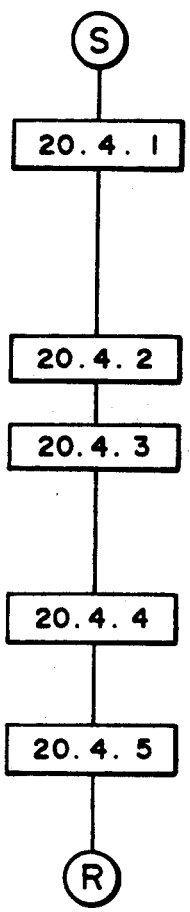
FIG. 26 shows an indent block lateral reduction process.

The step 20.4 is further described below. It includes five steps as shown in FIG. 26.

20.4.1 Longitudinally bisect the indent block in which the cursor is present by writing the indent codes longitudinally at the current cursor position.

20.4.2 Shift the current cursor position rightward by one position.

20.4.3 Write the lateral width of the newly formed indent block in which the cursor is present into the second word (lateral width) of the work buffer WB.

20.4.4 Set the value of the fourth word (cursor) of the work buffer WB to 1.

20.4.5 Set the leading column number of the newly formed indent block to the fifth word (indent block leading column) of the work buffer WB.

[Note]: In the indent left shift process (22.4), the right in the above description is read as left.

The above steps are further described below.

20.4.1 Bisect the indent block of the data buffer to form the reduced indent blocks. On the right hand of the longitudinally bisected indent block, the information which has been stored in the indent block is filled.

20.4.2 The cursor is shifted rightward by one position.

The new cursor position indicates the leading character position of the new indent block.

20.4.3~20.4.5 Update the parameters at the header of the work buffer WB with the parameters of the new indent block.

Figure 27:
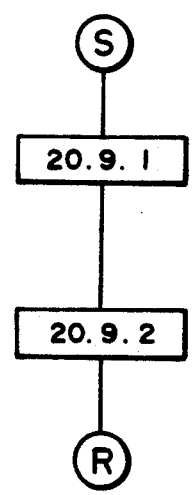
FIG. 27 shows an indent block lateral enlargement process.

The indent block lateral expansion process of the step 20.9 is further described below with reference to FIG. 27.

20.9.1 Change all indent marks defining the right edge of the indent block in which the cursor is present to the space marks.

20.9.2 Write the lateral width of the new expanded indent block to the second word (lateral width) of the work buffer WB.

The above steps function as follows.

20.9.1 Remove the indent marks on the right edge of the indent block of the data buffer to expand the indent block.

20.9.2 Update the value of the second word (lateral width) of the work buffer WB.

After the above process has been completed, the process waits for key input. If the decision in the step KB19 is NO, the process goes to a step KB21 where it is determined if the indent left shift key has been keyed. If the decision is YES, the input process is carried out in a step KB22.

This process is equivalent to that shown in FIG. 25A except that the term right in the description is to be read as left and the numeral 20 is to be read as 22.

The indent block lateral reduction process is equivalent to that shown in FIG. 26 except that the term right in the description is to be read as left and the numeral 20 is to be read as 22.

The indent block lateral expansion process is further described below.

Figure 28:
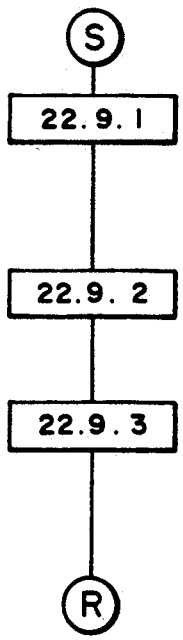
FIG. 28 shows an indent block lateral enlargement process,
FIG. 29 A shows an indent-rule conversion key input process,
FIG. 29 B shows a data flow,
FIG. 30 A shows a rule indent conversion key input process,
FIG. 30 B shows a data flow.

This process includes the steps shown in FIG. 28 and described below.

22.9.1 Change all indent marks defining the left edge of the indent block in which the cursor is present to the space marks.

22.9.2 Write the lateral width of the new expanded indent block to the second word (lateral width) of the word buffer WB.

22.9.3 Update the fifth word (beginning column of the indent block) of the work buffer WB with the beginning column of the new expanded indent block.

The above steps function as follows.

22.9.1 Remove the indent marks on the left edge of the indent block of the data buffer to expand the indent block.

22.9.2~22.9.3 Update the second word (lateral width) and the fifth word (beginning column of the indent block) with the values of the new indent block.

Figure 29A:
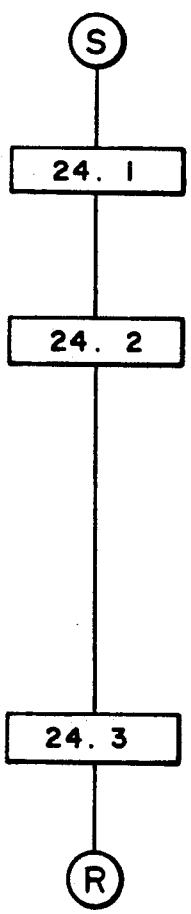

After the above process has been completed, the process waits for key input. If the decision in the step KB21 is NO, the process goes to a step KB23 where it is determined if the indent-rule conversion key has been keyed. If the decision is YES, the indent-rule conversion key input process is carried out in a step KB24. FIG. 29A shows a detailed flow thereof. It includes the following steps.

24.1 Transfer the content of the data buffer in the lines preceeding to the line in which the cursor is present to the work buffer.

24.2 Transfer the content of the data buffer in the line in which the cursor is present to the work buffer WB while converting the indent codes to the rule codes by referring the conversion table of FIG. 3D. The lines preceeding the line in which the cursor is present are ignored in referring to the conversion table.

24.3 Restore the content of the work buffer to the data buffer.

The above steps function as follows.

24.1 In this step, the work buffer format is defined in a completely different way. The concept of the indent block is not used here and the indent mark is handled as if it were a mere character.

The information in the lines preceeding the line in which the cursor is present is stored in the work buffer starting from the beginning area thereof.

24.2 Store the remaining information in the data buffer into the succeeding area of the work buffer while converting the indent codes to the rule codes by referring to the conversion table of FIG. 3D. The lines preceeding the line in which the cursor is present are ignored in referring to the conversion table.

In referring to the conversion table, it is necessary to examine the status of the upper, lower, right and left adjacent areas because the rule code conversion varies depending on the presence or absence of the indent codes on the top, bottom, right and left hands of the indent code to be converted.

24.3 Restore the content of the work buffer WB to the data buffer from the beginning.

Figure 29B:
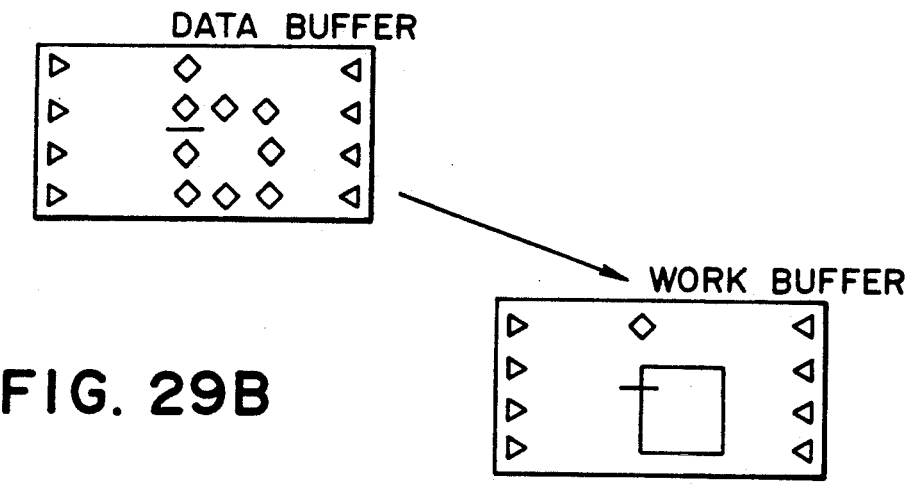

FIG. 29B shows an example of the indent-rule conversion process.

Figure 30B:
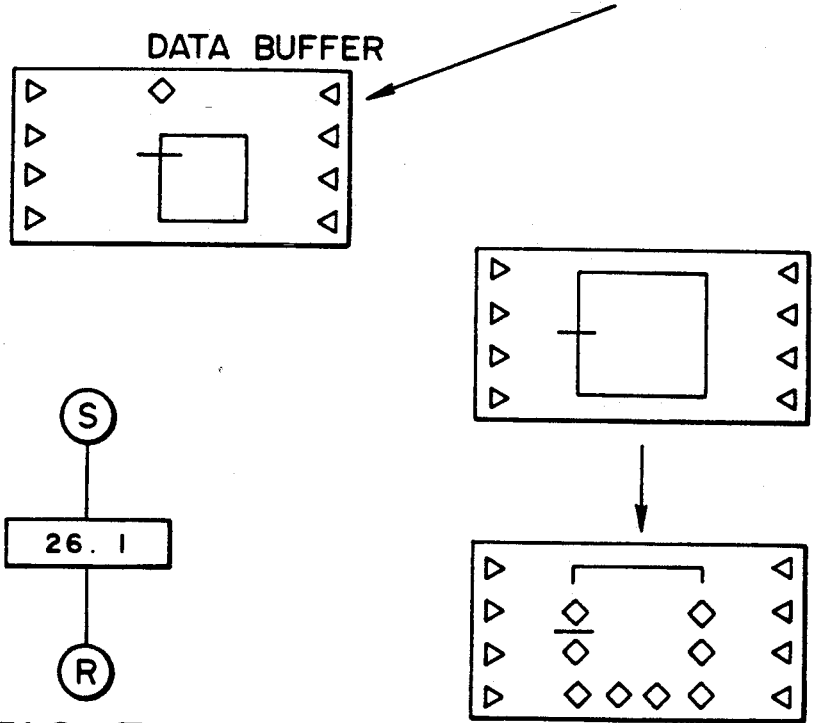

After the above process has been completed, the process waits for key input. If the decision in the step KB23 is NO, the process goes to a step KB25 where it is determined if the rule-indent conversion key has been keyed. If the decision is YES, the process shown in FIG. 30 is carried out in a step KB26.

26.1 Convert the rule codes in the lines following the line in which the cursor is present to the indent codes.

In this step, the rule codes in the lines in the data buffer following the line in which the cursor is present are converted to the indent codes.

Figure 30A:
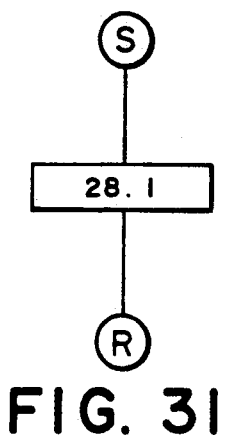

After the above process has been completed, the process waits for key input. If the decision in the step KB25 is NO, the process goes to a step KB27 where it is determined if the initializing key has been keyed. If the decision is YES, the initialization process is carried out. FIG. 30A shows a flow thereof.

1. Fill the space codes in the data buffer.
2. Write the left margin code and the right margin code at the positions of the data buffer corresponding to the left and right margin positions.

In the above steps, the initial values are set to the data buffer to initialize the character string to be displayed on the CRT screen. As a result, the left and right margins are displayed on the CRT screen and the space marks are displayed in the remaining area. All input operations are started by depressing the initialization key INT.

Figures 31, 32:
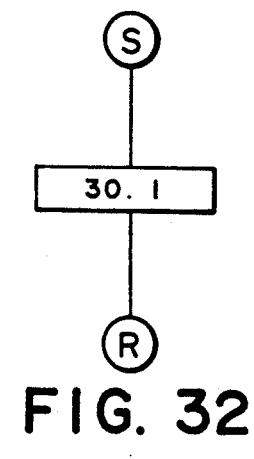
FIG. 31 shows an initialization process.
FIG. 32 shows a print key input process.

After the above process has been completed, the process waits for key input. If the decision in the step KB27 is NO, the process goes to a step KB29 where it is determined if the print key has been keyed. If the decision is YES, the print key input process is carried out in a step KB30 shown in FIG. 32. This step functions as follows.

Supply the content of the data buffer to the printer.

In this process, the content of the data buffer is printed out. It is preferable if the printer has a vertical and horizontal printing function.

After the above process has been completed, the process waits for key input. If the decision in the step KB29 is NO, the process also waits for key input.

What I claim is:

1. An information processor comprising:
    input means for entering information into said processor;
    memory means for storing boundary information used for editing said information input by said input means, said boundary information defining a region for arranging said information input by said input means;
    boundary information input means for entering additional boundary information into said processor to be supplementally added to said boundary information in said processor, said additional boundary information defining an independent editing region different from the region defined by said boundary information;
    manual designation means for moving said additional boundary information input by said boundary information input means; and
    rearranging means, when said additional boundary information is moved by said manual designation means to change the region defined by said boundary information, for rearranging said information arranged in the region defined by said boundary information according to the changed region before the region defined by said boundary information is changed, the information within the region not being arranged in another region.

2. An information processor according to claim 1, wherein said selecting means comprises a function key for selection.

3. An information processor according to claim 1, further comprising selecting means for selecting whether said additional boundary information input by said boundary input means should be visually displayed along with said information input by said input means.

4. An information processor according to claim 3, further comprising visualizing means for visualizing an additional region of said additional boundary information along with said information input by said input means in response to the selection of said selecting means.

5. An information processor according to claim 3, wherein said boundary information comprises a plurality of kinds of visual information.

6. An information processor for processing boundary information and character codes, comprising:
 information input means for entering character codes into said processor;
 memory means for storing boundary information used for editing said character codes input by said information input means, said boundary information defining a region for arranging such character codes input by said information input means;
 boundary input means for entering additional boundary information into said processor to be supplementally added to said boundary information and for causing said additional boundary information to be stored in said memory means, said additional boundary information defining an independent editing region different from the region defined by said boundary information;
 designation means for changing the editing region defined by said additional boundary information input by said boundary input means by moving said additional boundary information;
 rearranging means, when said additional boundary information is moved by said designation means to change said region, for rearranging character codes arranged in said region according to the changed region before said region is changed; and
 converting means for converting said additional boundary information into visual character information.

7. An information processor according to claim 6, wherein said coded character information comprises one of a plurality of character codes and wherein said processor includes character code memory means for storing said plurality of character codes each of which represents a format pattern of said framework format.

8. An information processor according to claim 6, wherein said boundary information comprises a plurality of kinds of visual information.

9. An information processor according to claim 6, wherein said information input means, said boundary input means, and said designation means comprises a common keyboard.

10. An information processor comprising:
 input means for entering information into said processor;
 memory means for storing boundary information used for editing said information input by said input means and by which said information input by said input means is arranged;
 boundary input means for entering boundary information into said processor, said information input by said input means also being arrangeable on the basis of said boundary information;
 checking means for checking the presence of an arrangement of the information in an editing region defined by said boundary information; and
 revising means, responsive to said checking means, for revising a region defined by said boundary information upon deletion of a portion of said information arranged on the basis of said boundary information, in the absence of an arrangement of said information input by said input means.

11. An information processor according to claim 10, further comprising selecting means for selecting whether said additional boundary information input by said boundary input means should be visually displayed along with said information input by said input means.

12. An information processor according to claim 10, wherein said boundary information comprises a plurality of kinds of visual information.

13. An information processor utilizing a cursor, comprising:
 input means for entering information into said processor;
 cursor moving means for moving the position of a cursor;
 memory means for storing boundary information used for editing said information input by said input means, said boundary information defining an editing region for arranging said information input by said input means in the editing region;
 boundary input means for entering boundary information into said processor, and for further defining another region in said editing region;
 designation means for changing the another region defined by said boundary information input by said boundary input means by moving said boundary information;
 rearranging means, when said boundary information is moved by said designation means to change said another region, for rearranging information arranged in said editing region according to the changed region before said editing region is changed; and
 displaying means for displaying said information in an editing region defined by said boundary information.

14. An information processor according to claim 13, wherein said moving means includes a carriage return key.

15. An information processor according to claim 13, wherein said boundary information comprises a plurality of kinds of visual information.

16. An information processor comprising:
 input means for entering information into said processor;
 memory means for storing boundary information used for editing said information input by said input means, said boundary information defining an editing region for arranging said information input by said input means;
 boundary input means for entering additional boundary information into said processor to be supplementally added to said boundary information in said memory means, said additional boundary information further defining another editing region in said editing region when added to said boundary information;
 designation means for changing the editing region defined by said additional boundary information input by said boundary input means;
 first enabling means for enabling said information to be entered by said input means into the another editing region specified by said additional boundary information;

second enabling means for enabling said information input by said input means to be entered into the editing region specified on the basis of said boundary information from the another region specified on the basis of said additional boundary information upon the repeat entry of a specific information of said information input by said input means; and displaying means for displaying said editing region and the another editing region.

17. An information processor according to claim 16, further comprising a carriage return key for inputting said specific information.

* * * * *

UNITED STATES PATENT AND TRADEMARK OFFICE
CERTIFICATE OF CORRECTION

PATENT NO. : 5,276,792
DATED : January 4, 1994
INVENTOR(S) : KATSUMI MASAKI

It is certified that error appears in the above-indentified patent and that said Letters Patent is hereby corrected as shown below:

COLUMN 1:
    line 23, "desire" should read --desired--.
    line 62, "line feed process" should be deleted.

COLUMN 4:
    line 40, "follows:Horizontal" should read
--follows: ¶ Horizontal--.
    line 41 close up right margin
    line 42, close up left margin
    line 65, "◊" should read --◊.--.

COLUMN 6:
    line 17, "position" should read --position.--.

COLUMN 8:
    line 58, "keyed" should read --keyed.--.

COLUMN 9:
    line 19, "Overwrite" should read --Overwrite.--.
    line 20, "Insert" should read --Insert.--.
    line 21, "block" should read --block.--.

COLUMN 10:
    line 3, "16.6." should read --16.6 in FIG. 13B.--.
    line 9, "16.2.1" should read --16.2.2--.

COLUMN 12:
    line 55, "row" should read --row.--.

UNITED STATES PATENT AND TRADEMARK OFFICE
CERTIFICATE OF CORRECTION

PATENT NO. : 5,276,792
DATED : January 4, 1994
INVENTOR(S) : KATSUMI MASAKI

It is certified that error appears in the above-indentified patent and that said Letters Patent is hereby corrected as shown below:

COLUMN 13:
    line 9, "6.3.2.1" should read --16.6.3.2.1--.
    line 29, "one" should read --once--.
    line 58, "margins)" should read --margins).--.

COLUMN 14:
    line 4, "16.6.6 2" should read --16.6.6.2--.
    line 28, "input" should read --input.--.
    line 33, "follows" should read --follows.--.
    line 39, "(16.2)" should read --(16.2).--.
    line 40, "Delete" should read --Delete.--.
    line 41, "(16.6)" should read --(16.6).--.

COLUMN 15:
    line 34, "present)" should read --present).--.

COLUMN 19:
    line 52, "comprises" should read --comprise--.

Signed and Sealed this

Second Day of August, 1994

Attest:

BRUCE LEHMAN

Attesting Officer      Commissioner of Patents and Trademarks